(12) United States Patent
Lorenz et al.

(10) Patent No.: US 10,960,626 B2
(45) Date of Patent: Mar. 30, 2021

(54) BIDIRECTIONAL TIRE STITCHING WHEEL

(71) Applicant: Bridgestone Americas Tire Operations, LLC, Nashville, TN (US)

(72) Inventors: Zachary G. Lorenz, Nashville, TN (US); Jason J. Para, Franklin, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 274 days.

(21) Appl. No.: 15/992,373

(22) Filed: May 30, 2018

(65) Prior Publication Data

US 2018/0345611 A1 Dec. 6, 2018

Related U.S. Application Data

(60) Provisional application No. 62/514,987, filed on Jun. 5, 2017.

(51) Int. Cl.
*B29D 30/28* (2006.01)
*B29D 30/60* (2006.01)

(52) U.S. Cl.
CPC .............. *B29D 30/28* (2013.01); *B29D 30/60* (2013.01)

(58) Field of Classification Search
CPC .................... B29D 30/28; B29D 30/14; B29D 2030/3257; B29D 2030/3064
USPC .......................... 156/421; 492/60, 42, 45, 33
See application file for complete search history.

(56) References Cited

U.S. PATENT DOCUMENTS

| | | |
|---|---|---|
| 1,834,559 A | 12/1931 | Waner |
| 2,490,445 A | 12/1949 | Kuffler |
| 2,541,648 A | 2/1951 | Haase |
| 3,051,220 A | 8/1962 | Ewing et al. |
| 3,268,380 A | 8/1966 | Guichon et al. |
| 3,546,043 A | 12/1970 | Miksch |
| 3,707,749 A * | 1/1973 | Henley ............. F16C 13/00 492/5 |
| 3,726,735 A | 4/1973 | Harris |

(Continued)

FOREIGN PATENT DOCUMENTS

| | | |
|---|---|---|
| EP | 0581404 | 4/1996 |
| EP | 0692368 | 4/2000 |

(Continued)

OTHER PUBLICATIONS

European Search Report conducted by Christian Kopp dated Sep. 27, 2018 in Munich, Germany for the European Patent Office.

(Continued)

*Primary Examiner* — Robert C Dye
*Assistant Examiner* — Alexander D Booth

(57) ABSTRACT

A bidirectional stitching wheel may be able to conform to peaks and valleys of green rubber while building a tire. The bidirectional stitching wheel may include an inner ring including a stitcher rotation axis. The inner ring may be rotatable in a first stitcher rotational direction about the stitcher rotation axis. The inner ring may also be rotatable in a second stitcher rotational direction about the stitcher rotation axis. A flexible outer ring may be radially spaced from the inner ring. A flexible intermediate layer may be disposed between the inner ring and the outer ring. The flexible intermediate layer may be substantially equally deformable during rotation of the inner ring in both the first stitcher rotational direction and the second stitcher rotational direction.

24 Claims, 20 Drawing Sheets

(56) References Cited

U.S. PATENT DOCUMENTS

| | | | |
|---|---|---|---|
| 4,039,366 A | 8/1977 | Yabe | |
| 4,052,246 A | 10/1977 | Albareda et al. | |
| 4,105,487 A | 8/1978 | Suzuki et al. | |
| 4,314,864 A | 2/1982 | Loeffler et al. | |
| 4,402,782 A | 9/1983 | Klose et al. | |
| 4,473,427 A | 9/1984 | Irie | |
| 4,614,562 A | 9/1986 | Jones | |
| 4,900,382 A | 2/1990 | Klose | |
| 5,454,897 A * | 10/1995 | Vaniglia | B29C 70/32 156/166 |
| 5,464,489 A | 11/1995 | De Graaf | |
| 5,526,859 A | 6/1996 | Saito et al. | |
| 5,882,452 A | 3/1999 | Sakamoto et al. | |
| 6,630,045 B1 | 10/2003 | Roedseth | |
| 2005/0028920 A1 | 2/2005 | Roedseth | |
| 2005/0282692 A1* | 12/2005 | Redden | B65G 39/06 492/40 |
| 2006/0048884 A1* | 3/2006 | Kudo | B29D 30/14 156/130.3 |
| 2009/0283185 A1* | 11/2009 | Manesh | B60B 9/04 152/11 |
| 2011/0024053 A1 | 2/2011 | Byerley | |
| 2015/0013863 A1 | 1/2015 | Snyder et al. | |

FOREIGN PATENT DOCUMENTS

| | | |
|---|---|---|
| EP | 1625931 | 2/2006 |
| EP | 2286986 | 2/2011 |
| JP | 054903 | 6/1985 |
| JP | 05169564 | 7/1993 |
| JP | 5695413 | 12/2010 |
| WO | 2009131578 | 10/2009 |
| WO | 2013107980 | 7/2013 |
| WO | 2013176676 | 11/2013 |

OTHER PUBLICATIONS

Abstract and bibliographic data for EP2804749 filed on Jan. 16, 2013 owned by Michelin Recherche et Technique SA Switzerland.
Machine translation of WO2013107980 filed on Jul. 25, 2013 owned by Michelin Recherche Et Technique S.A.
Machine translation of JPH05169564 filed on Jul. 9, 1993 owned by Yokohoma Rubber Co Ltd.
Machine translation of JPH054903 filed on Jun. 26, 1985 owned by Yokohoma Rubber Co Ltd.
Machine translation of JP5695413 filed on Dec. 22, 2010 owned by Sumitomo Rubber Ind.

\* cited by examiner

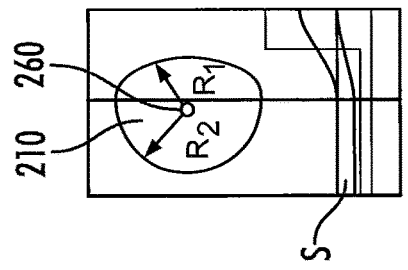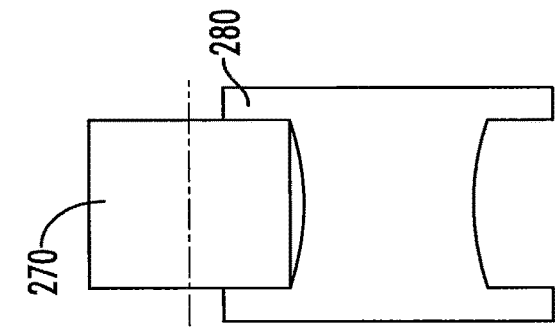
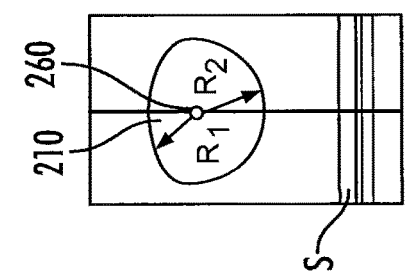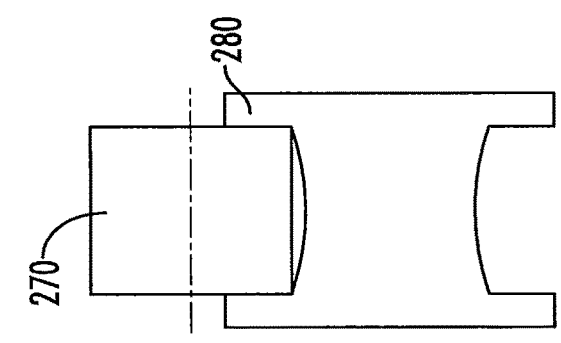
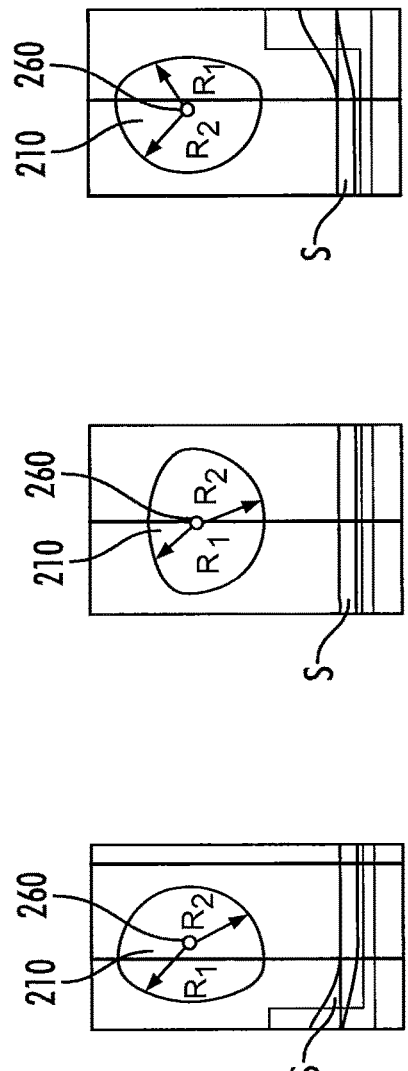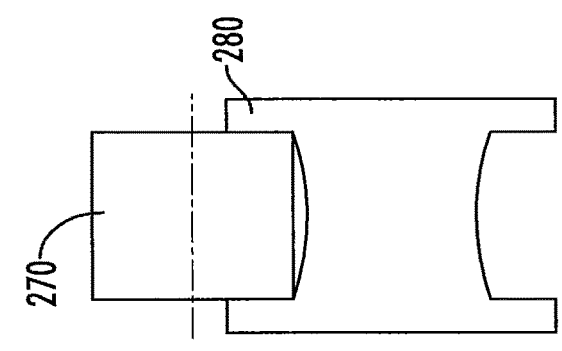
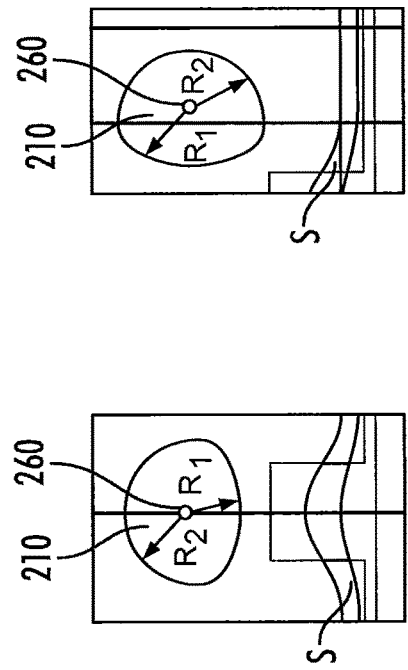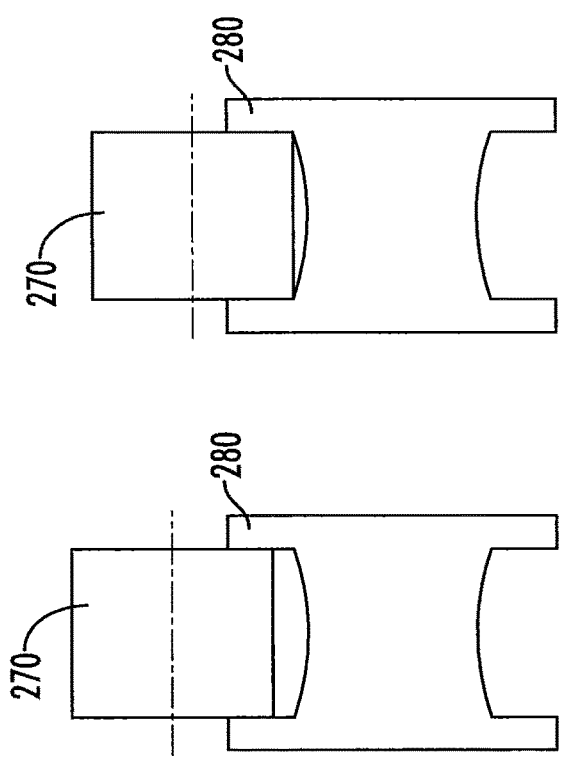
FIG. 4A  FIG. 4B  FIG. 4C  FIG. 4D
FIG. 5A  FIG. 5B  FIG. 5C  FIG. 5D

BIDIRECTIONAL TIRE STITCHING WHEEL

This application claims the benefit of U.S. Provisional Application Ser. No. 62/514,987 filed Jun. 5, 2017, the contents of which are incorporated herein in their entirety by reference.

BACKGROUND

The present disclosure relates generally to a stitching wheel for a tire building machine. More particularly, the present disclosure pertains to a bidirectional stitching wheel for stitching together layers of a green tire.

Known tire manufacturing methods involve building a green tire, including a green tread, and vulcanizing the green tire and tread in a mold. The tread may be built by a ribbon treading process, in which a ribbon of green rubber is continuously applied in a spiral manner to a drum. The layers of green rubber ribbon are typically pressed against each other, or stitched, with a wheel connected to the tire building machine. Typical tire building methods involve maintaining the green rubber layers as smooth as possible and stitching them together with a wheel providing pressure from a generally constant distance. The wheel is typically solid and generally rigid. When a green tire is placed in a mold, the volume between the green tire and the mold features must be filled with rubber. Thus, viscous rubber flows into the volume between the green tire and the mold features. The viscous rubber and green tire are cured during vulcanization. These methods, however, can lead to an excess waste of viscous rubber.

What is needed, therefore, is an apparatus and/or method that allows for less waste of viscous rubber in creating a tire.

BRIEF SUMMARY

Briefly, the present disclosure relates, in one embodiment, to a tire building machine. The tire building machine may include a drum for receiving layers of green rubber to build a tire. The drum may include a drum rotation axis. The drum may be configured to rotate about the drum rotation axis in a first drum rotational direction and a second drum rotational direction opposite the first drum rotational direction. The tire building machine may also include a bidirectional stitching wheel. The bidirectional stitching wheel may include a stitcher rotation axis. The stitching wheel may be configured to rotate about the stitcher rotation axis in a first stitcher rotational direction and a second stitcher rotational direction opposite the first stitcher rotational direction. The stitching wheel may be further configured to be deformable to a substantially similar degree during rotation in both the first stitcher rotational direction and the second stitcher rotational direction. The stitching wheel may rotate in the first stitcher rotational direction when the drum rotates in the first drum rotational direction. The stitching wheel also may rotate in the second stitcher rotational direction when the drum rotates in the second drum rotational direction.

In any embodiment, the bidirectional stitching wheel may include a fluid filled stitching wheel.

In any embodiment, the bidirectional stitching wheel may include a deformability during rotation in the first stitcher rotational direction that is between about 90% and about 110% of a deformability of the bidirectional stitching wheel during rotation in the second stitcher rotational direction.

In any embodiment, the stitching wheel may be configured to passively rotate due to rotation of the drum.

In any embodiment, the tire building machine may further include a plurality of bidirectional stitching wheels.

In any embodiment, the stitching wheel may further include an inner ring including a stitcher rotation axis. The inner ring may be rotatable in a first stitcher rotational direction about the stitcher rotation axis. The inner ring may also be rotatable in a second stitcher rotational direction about the stitcher rotation axis. A flexible outer ring may be radially spaced from the inner ring. A flexible intermediate layer may be disposed between the inner ring and the outer ring. The flexible intermediate layer may be substantially equally deformable during rotation of the inner ring in both the first stitcher rotational direction and the second stitcher rotational direction.

In any embodiment, the inner ring may include a polymeric material.

In any embodiment, the inner ring may further include a hub to connect the stitching wheel to a shaft.

In any embodiment, the hub may include a material other than a polymer. The hub may also be overmolded with the polymeric material of the inner ring.

In any embodiment, the hub may include a material other than a polymer. The inner ring may be fastened to the hub.

In any embodiment, the outer ring and the flexible intermediate layer may also include a polymeric material.

In any embodiment, the inner ring, the outer ring, and the flexible intermediate layer may be integrally formed together.

In any embodiment, the flexible intermediate layer may include a foamed polymeric material.

In any embodiment, the flexible intermediate layer may include an interconnected web.

In any embodiment, interconnected web may include a plurality of polygonal cells.

In any embodiment, the flexible intermediate layer may further include a foam disposed between the interconnected web.

In any embodiment, the flexible intermediate layer may further include a fluid disposed between the interconnected web.

In any embodiment, the flexible intermediate layer may include a fluid.

In any embodiment, the bidirectional stitching wheel may be substantially radially symmetrical.

In any embodiment, the outer ring may include at least one internal support layer.

In any embodiment, the at least one internal support layer may include a steel belt.

The present disclosure also relates, in an embodiment, to a method of stitching together layers of a green tire, the method may include: (a) rotating a drum about a drum rotation axis in a first drum rotational direction with green rubber on the drum; (b) engaging an outer layer of the green rubber with a bidirectional stitcher while performing step (a), the bidirectional stitcher may be rotating about a stitcher rotation axis in a first stitcher rotational direction opposite the first drum rotational direction; (c) deforming the bidirectional stitcher around a respective peak of the outer layer of the green rubber while performing steps (a) and (b); (d) rotating the drum about the drum rotation axis in a second drum rotational direction opposite the first drum rotational direction; (e) engaging the outer layer of the green rubber with the bidirectional stitcher while performing step (d), the bidirectional stitcher may be rotating about the stitcher rotation axis in a second stitcher rotational direction opposite the second drum rotational direction; and (f) deforming the bidirectional stitcher around a respective peak of the outer layer of the green rubber while performing steps (d) and (e).

In any embodiment, the method may further include pressing the bidirectional stitcher against the outer layer of the green rubber during steps (b) and (e) such that the bidirectional stitcher deforms at least partially when unengaged by a peak of the outer layer of the green rubber.

BRIEF DESCRIPTION OF THE DRAWINGS

FIGS. 4A-4D are schematic cross-sectional views of a cam in various orientations and corresponding resulting rubber strips.

FIGS. 5A-5D are schematic cross-sectional views of a roller die in various positions corresponding to the orientations of the cam shown in FIGS. 4A-4D.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, one or more sections of hooks and corresponding one or more sections of loops, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise; any part of the apparatus of the present disclosure may be made of any appropriate or suitable material including, but not limited to, metal, alloy, polymer, polymer mixture, wood, composite, or any combination thereof.

The word "fluid" should be interpreted to mean any substance that is able to flow, any substance that has no fixed shape and yields to external pressure, and any substance that at least partially exhibits any one of these traits. "Fluid" may mean any liquid, gas, aggregate of solid particles, or some combination thereof that at least somewhat exhibits any of the above traits.

Figure 1A:
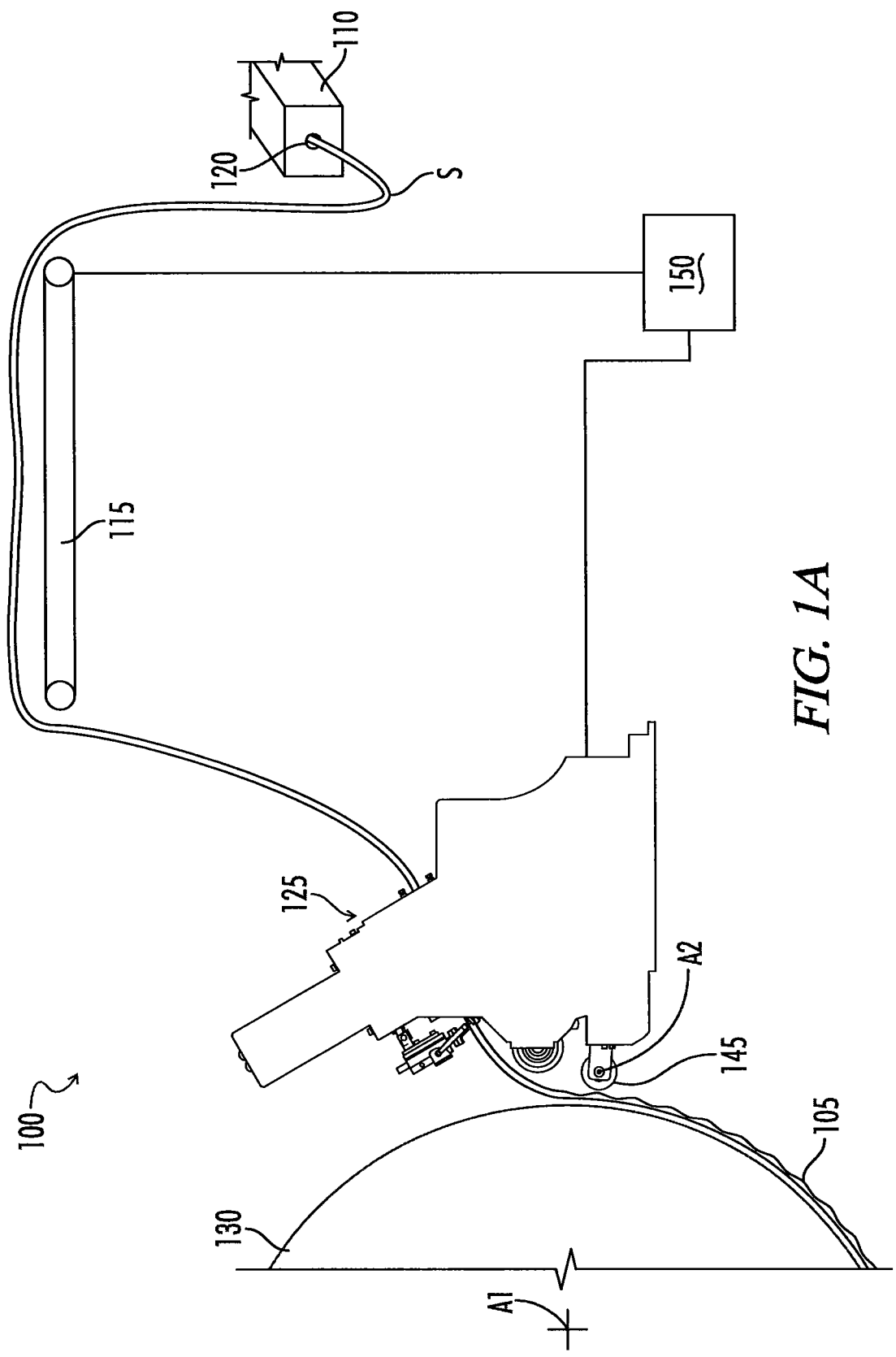
FIG. 1A is a schematic drawing illustrating a side view of a system for making a tire tread including an embodiment of the bidirectional stitching wheel.

FIG. 1A is a schematic drawing illustrating a side view of one embodiment of a system, or tire building machine, 100 for making a green tread 105. The system 100 may include an extruder 110 configured to receive a mixture of green rubber and eject it as a strip S onto a conveyor 115. As one of ordinary skill in the art would understand, green rubber is rubber that is yet to be vulcanized. The system 100 is not limited to processing green rubber, however, and any polymeric material may be employed.

The extruder 110 may include an opening 120 that defines the shape of the extruded strip S. Here, the opening 120 is oval-shaped, so the resulting strip S has an ovular cross-section. Such an ovular strip may also be referred to as an ovular ribbon or an oval noodle. In alternative embodiments, the strip may have a circular, rectangular, trapezoidal, triangular, pentagonal, or other geometric or complex cross-section when it is extruded. In other alternative embodiments, the cross-section of the strip may be any geometric shape. The shape of the strip may be defined by a die plate that imparts a shape on the ribbon. Alternatively, the strip may be shaped by rollers as it is extruded.

The conveyor 115 may include a first end proximate to the extruder 110 to receive the extruded strip S. The conveyor 115 may be made of an inextensible material, such as polyester. Because the extrusion process may warm the rubber, the strip S may be tacky and may stick well against conveyor 115 without need for adhesives. In one known embodiment, the temperature of the rubber strip S may be approximately 200° F. (93° C.) as it exits the extruder 110. However, it should be understood that the rubber may be at any temperature. In an alternative embodiment, at least one side of the conveyor may be coated with an adhesive or a resin to obtain proper adhesion to the green rubber strip.

The conveyor 115 may feed the strip of green rubber to a roller die 125, which may shape the strip S and apply it onto a drum 130. In an alternative embodiment (not shown), the strip of green rubber may be applied directly to a tire carcass. In other embodiments (not shown), the strip of green rubber may be applied to any type of receptacle.

Figure 1B:
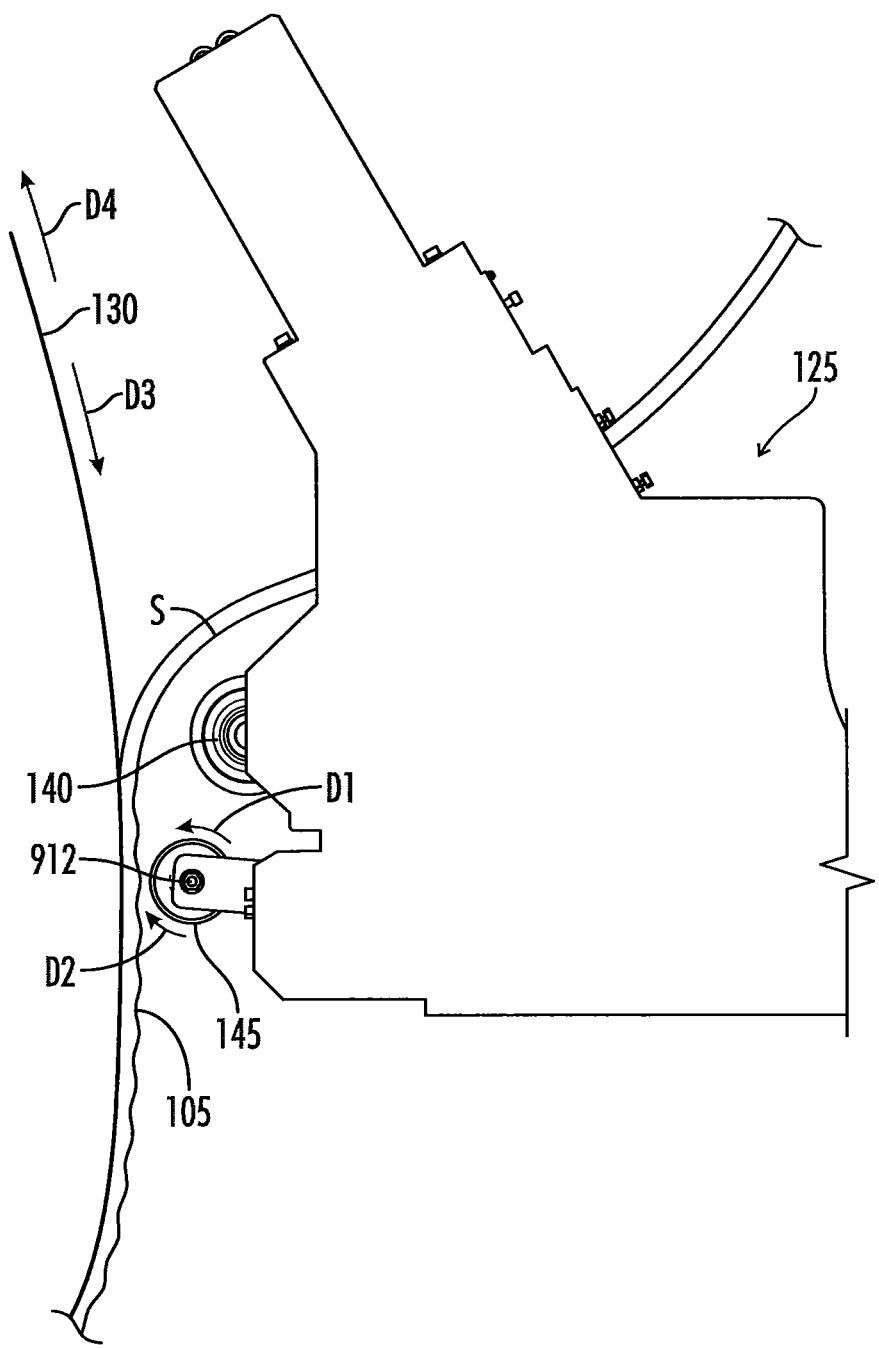
FIG. 1B is a schematic drawing of a detailed view of a roller die in the system of FIG. 1A.

As can be seen in FIG. 1B, the strip S may be carried forward by an applicator wheel 140, and the roller die 125 may apply the strip S onto the drum 130. In an alternative embodiment (not shown), a separating device such as a knife may be employed to cut the strip to complete the treading process.

The roller die may further include a stitching wheel 145 for pressing the strip S onto the drum 130. The stitching wheel 145 may be connected to a damper that keeps the stitching wheel 145 in consistent contact with the strip S. In some embodiments, this consistent contact may at least partially prevent air from getting trapped between layers of the tread strips. The stitching wheel 145 may be coated with a synthetic resin to prevent it from sticking to the strip S. A more in-depth description of the stitching wheel 145 can be found below.

As can be seen in FIGS. 1A and 1B, applicator wheel 140 and the drum 130 may rotate in opposite directions. The strip may then be circumferentially wound about the drum 130. For example, in the view shown in FIG. 1B, the drum 130 may rotate in a clockwise direction and the applicator wheel 140 may rotate in a counter-clockwise direction.

The roller die 125 may be configured to translate in a direction parallel to the drum rotation axis A1 of the drum 130 while the drum and the applicator wheel 140 each rotate. As a result, the strip S may be spiral wound about the drum 130. For example, the roller die 125 may translate along one or more rails that are parallel to the drum rotation axis A1.

In one embodiment, the applicator wheel 140 may be attached to a calender head apparatus, such that the applicator wheel 140 may move in and out from the drum 130 according to the movement of the calender head. In an alternative embodiment, the applicator wheel 140 may be attached to a separate cylinder that moves it in and out from the drum 130.

With reference back to FIG. 1A, a controller 150 may be in signal communication with the conveyor 115, the roller die 125, and the drum 130. The controller 150 may be configured to control the speed of the conveyor 115. The controller 150 may also be configured to control the translation of the roller die 125 in a direction parallel to its axis of rotation. The controller 150 may be further configured to adjust the roller die 125 to change a thickness of the strip of green rubber as it is applied to the drum 130. The controller may be a computer, a PLC, or other controller. While a single controller is shown in the illustrated embodiment, it should be understood that any number of controllers may be employed.

In one embodiment, the controller 150 may be further configured to control the rotational speed of the roller die 125 (for example, by controlling the rotational speed of the applicator wheel 140) and the rotational speed of the drum 130. In one embodiment, the applicator wheel 140 may be controlled by a timing belt. In another embodiment, there is no timing belt and the applicator wheel 140 may be driven through contact with the drum 130. The conveyor 115 may be a passive conveyor. In such an embodiment, the controller 150 may control the speed of the conveyor 115 and the rotational speed of the roller die simultaneously.

Figure 2:
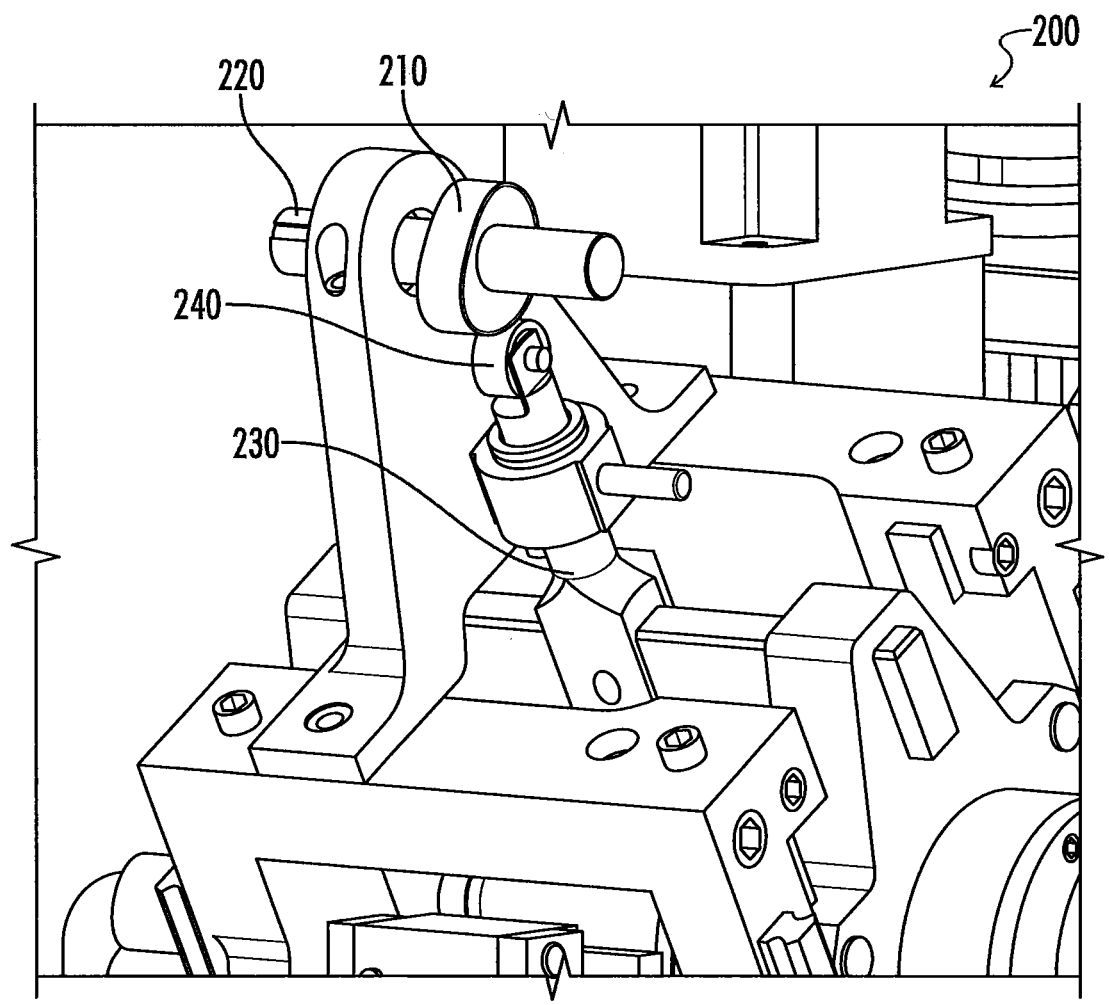
FIG. 2 is a detailed perspective view of a cam subsystem of the system of FIG. 1A, with some components removed.
Figure 3A:
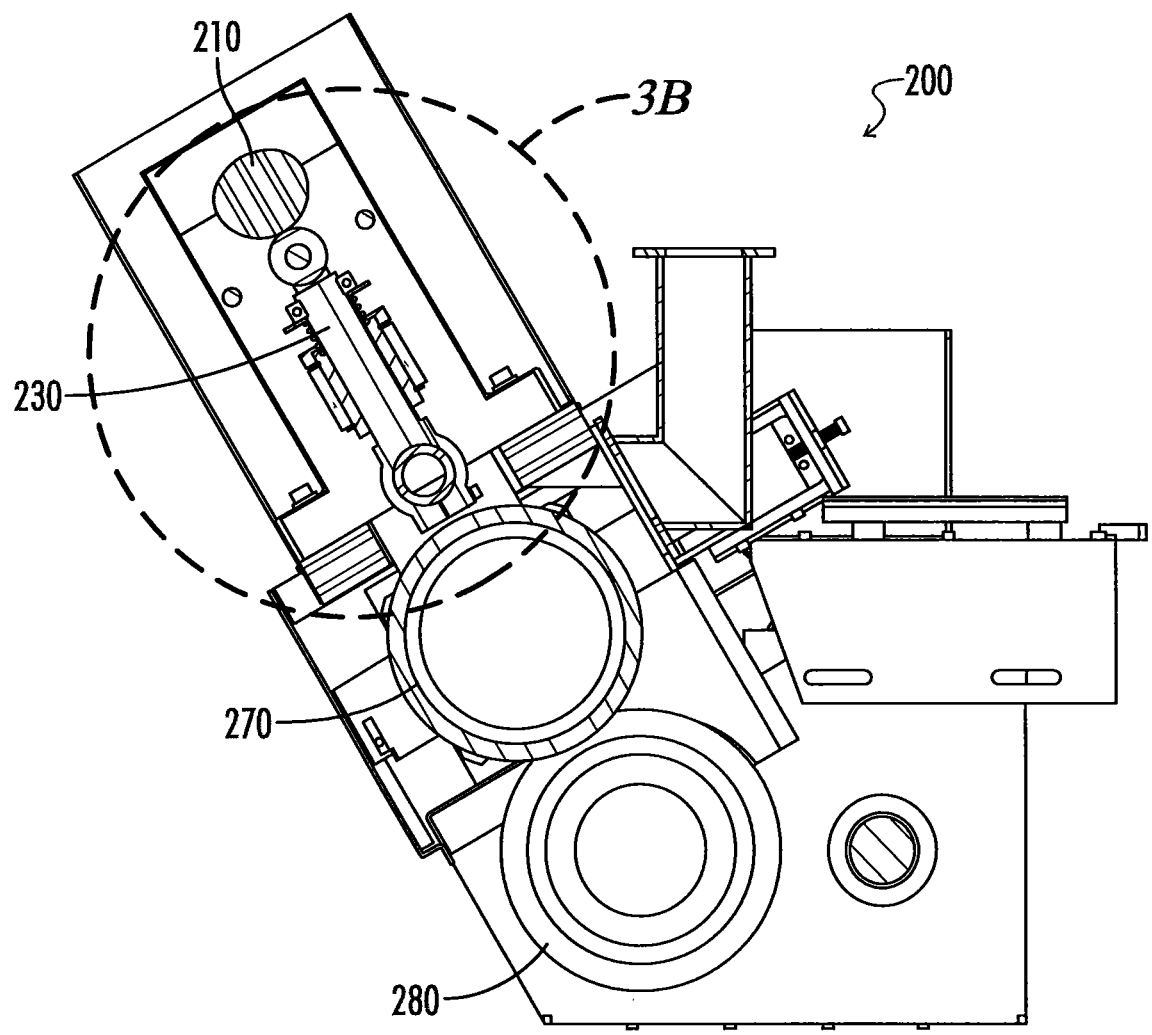
FIG. 3A is a partial cross-sectional view of the cam subsystem of FIG. 2.
Figure 3B:
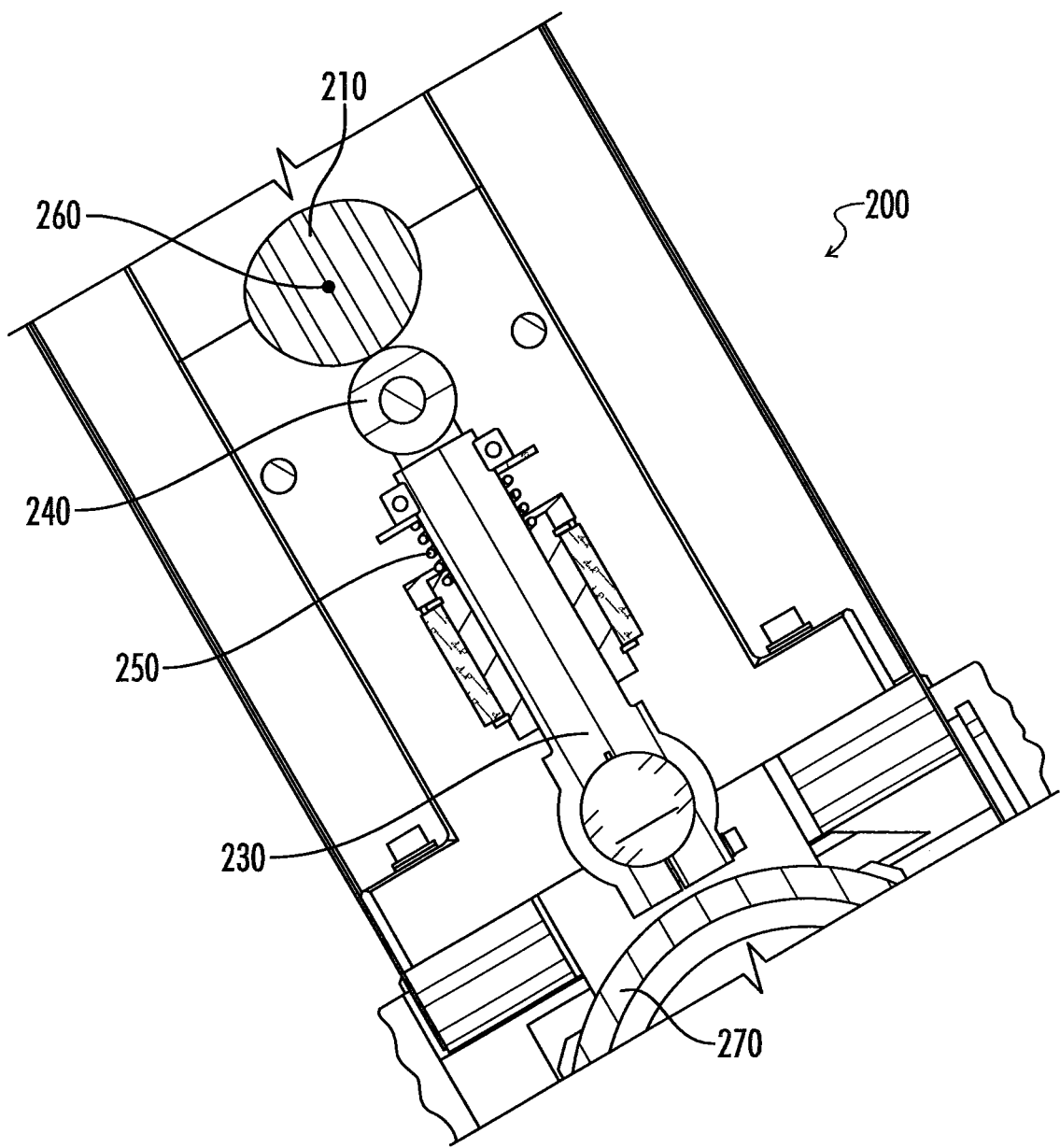
FIG. 3B is a detailed cross-sectional view of the cam subsystem of FIG. 2.

An exemplary cam and follower system is illustrated in FIGS. 2, 3A, and 3B. The cam subsystem 200 may include a cam 210 disposed on a rotating shaft 220. In the illustrated embodiment, the cam may include an eccentric wheel. In an alternative embodiment, the cam may include a cylinder with an irregular shape. The cam 210 may engage a follower 230 as it rotates. The follower 230 may include a roller 240 that contacts the cam 210. In alternative embodiments, the roller 240 may be omitted. In such an embodiment, the follower 230 may simply include a shaft. In any embodiment, the cam 210 or the follower 230 may be lubricated or constructed of low friction materials.

The follower 230 may be biased towards the cam 210 by a spring 250. The roller 240 may maintain contact with the cam 210. As the cam 210 rotates, the biasing force of the spring 250 and the eccentric shape of the cam 210 may cause the follower 230 to translate towards or away from the cam's axis of rotation 260. In alternative embodiments (not shown), other biasing mechanisms may be employed.

An opposite end of the follower 230 may be connected to an upper roller 270 that is spaced from a lower roller 280. In the illustrated embodiment, the lower roller 280 may not translate up and down or side to side. Therefore, when the follower 230 moves towards the cam's axis of rotation 260, the upper roller 270 may likewise move towards the cam's axis of rotation 260, thereby increasing a height of an opening between the upper roller 270 and the lower roller 280. Similarly, when the follower is pushed away from the cam's axis of rotation 260, the upper roller 270 may move away from the cam's axis of rotation 260, thereby decreasing the height of the opening between the upper roller 270 and the lower roller 280. In an alternative embodiment (not shown), the follower 230 may be attached to the lower roller 280, and the upper roller 270 is stationary. In another alternative embodiment (not shown), both the upper and lower rollers 270, 280 may be connected to followers and both may be configured to translate.

As shown in FIGS. 4A-4D and FIGS. 5A-5D, because the opening between the upper roller 270 and lower roller 280 may define the thickness of the resulting rubber strips, the changing orientation of the cam 210 may cause the thickness of the rubber strip S to change as it passes through the cam subsystem 200. In the illustrated embodiment, the cam 210 may include a first radius $R_1$ and a second radius $R_2$ that is greater than the first radius $R_1$. In FIG. 4A, the cam 210 is in a first position, such that it may engage the follower (not shown) at a surface having the first radius $R_1$, which may be a minimum radius. As a result, the follower may be biased towards the cam's axis of rotation 260. As shown in FIG. 5A, when the cam 210 is in this first position, the opening between the upper roller 270 and the lower roller 280 may have a maximum height. As a result, the rubber strip S may have a maximum thickness, as shown in FIG. 4A.

In FIG. 4B, the cam 210 is in a second position, rotated 90 degrees clockwise from the first position. In this second position, the cam 210 may engage the follower (not shown) at a surface having the second radius $R_2$, which may be a maximum radius. As a result, the follower may be biased away from the cam's axis of rotation 260. As shown in FIG. 5B, when the cam 210 is in this second position, the opening between the upper roller 270 and the lower roller 280 may have a minimum height. As a result, the rubber strip S may have a minimum thickness, as shown in FIG. 4B.

In FIG. 4C, the cam 210 is in a third position, rotated 90 degrees clockwise from the second position. In this third position, the cam 210 may still engage the follower (not shown) at a surface having the second radius $R_2$. As a result, the follower may remain biased away from the cam's axis of rotation 260. As shown in FIG. 5C, when the cam 210 is in this third position, the opening between the upper roller 270 and the lower roller 280 may maintain a minimum height. As a result, the rubber strip S may have a minimum thickness, as shown in FIG. 4C.

In FIG. 4D, the cam 210 is in a fourth position, rotated 90 degrees clockwise from the third position. In this fourth position, the cam 210 may still engage the follower (not shown) at a surface having the second radius $R_2$. As a result, the follower may remain biased away from the cam's axis of rotation 260. As shown in FIG. 5D, when the cam 210 is in this fourth position, the opening between the upper roller 270 and the lower roller 280 may maintain a minimum height. As a result, the rubber strip S may have a minimum thickness, as shown in FIG. 4D.

As can be seen in FIGS. 5A-5D, the outer sides of a lower portion of the upper roller 270 may be in contact with the inner sides of the upper portion of lower roller 280. In other words, the upper and lower rollers may be nested within each other, such that their vertical surfaces may form a seal that prevents the rubber from leaking out of the die. As one of ordinary skill in the art would understand, a tight clearance would minimize rubber leakage.

In an alternative embodiment (not shown), the contact area may be reduced to reduce drag. For example, one or more of the side surfaces may be angled or flanged. In another alternative embodiment, the contact areas may be constructed of different materials that are selected to reduce drag. In yet another alternative embodiment (not shown), lubricant, bearings, or other drag-reducing means may be employed. It should be understood that the embodiment of FIGS. 5A-5D is merely exemplary and that other sealing methods and devices may be employed.

It should be understood that the examples shown in FIGS. 4A-4D and FIGS. 5A-5D are not intended to be limiting. The cam profile may be defined by any number of radii, to produce a strip S having any desired profile. It should also be understood that the four positions depicted at 90° intervals are not the only positions that may define the motion profile of the upper roller die 270.

Figure 6:
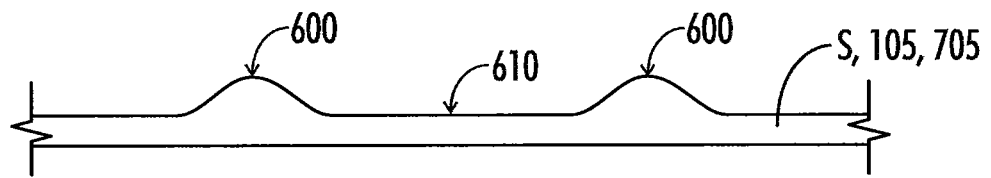
FIG. 6 is a cross-sectional side view of a rubber strip produced by the system shown in FIG. 1A.

Turning now to FIG. 6, a rubber strip S produced according to one embodiment of the above described process is shown. In this particular embodiment, the rubber strip S may include both peaks 600 and valleys 610 according to the local thickness of the rubber strip. The rubber strip S may maintain a constant width along its length in some embodiments. The rubber strip S may form the green tread 105.

Figure 7:
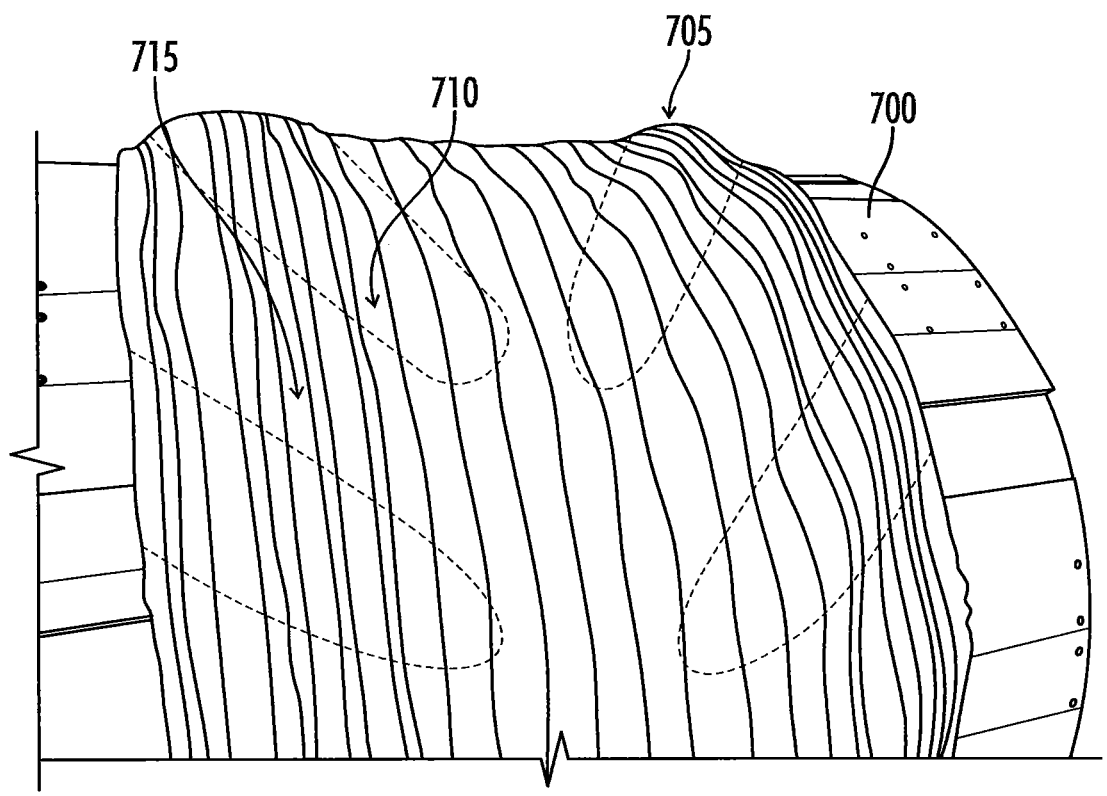
FIG. 7 is a partial perspective view of an example of a tire tread strip that is spiral wound about a drum according to the system of FIG. 1A.

FIG. 7 illustrates one embodiment of a green ribbon tread. In this embodiment, a drum 700 holds a green ribbon tread 705 having pre-formed peaks 710 and valleys 715. The peaks 710 and valleys 715 may be formed by the controller 150 and the cam and follower system 200 adjusting the upper roller die 270 with respect to the lower roller die 280, as described above. In one embodiment, the rubber strip S may be applied to the drum 700 at a rate between 10 kilograms per minute and 35 kilograms per minute. However, it should be understood that any rotational speeds and any feed rate may be employed.

Figure 8:
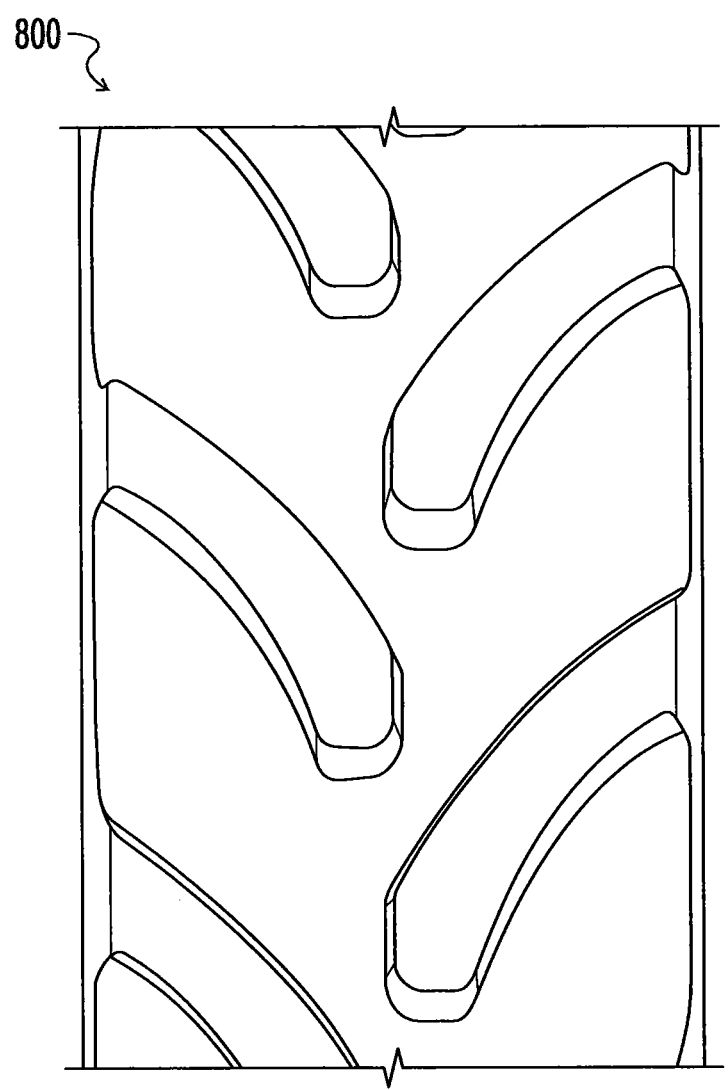
FIG. 8 is a top plan view of an example of the tread design of a tire.

In one embodiment, the controller 150 may control the cam and follower system 200 so that peaks and valleys are formed that correspond to lug forming portions of a tire mold. For example, FIG. 8 illustrates a top plan view of an exemplary tread design 800 of a tire. The peaks 710 and valleys 715 of the green ribbon tread 705 correspond to the lugs of the tread design 800. As one of ordinary skill in the art would understand, increasing the similarity between peaks 710 and valleys 715 of the green ribbon tread 705 and the mold features may help to reduce rubber flow in the curing press. However, the shape of the green tread elements may depart from the geometry of a cured tread.

As one of ordinary skill would understand, increased height of the peaks 710 is desirable for deep mold lugs because it would require less rubber movement during vulcanization. Additionally, using less rubber in the valleys 715 reduces the weight of the tire.

In one particular embodiment, the tread may be designed for use on an agricultural tire or off road tire. As one of ordinary skill in the art would recognize, the tread design may be used in agricultural tire constructions designated as R1, R1W, and R2 constructions, where R1 corresponds to a standard skid depth (Tire et Rim Association Standard AG-09-21), R1W corresponds to a skid depth that is 20% deeper than R1, and R2 corresponds to a skid depth that is 200% of R1. Additional examples of tires utilizing skids include, without limitation, drive wheels for agricultural vehicles, irrigation tires, forestry tires, floatation tires, combine tires, tractor tires, mining tires, construction tires, sprayer tires, and off-the-road vehicles.

In the illustrated embodiment, the drum 700 may be a collapsible drum. After the green ribbon tread 705 is completed, the drum 700 may be collapsed so that the green ribbon tread 705 can be removed and then placed around a tire carcass (not shown) to form a green tire. The green ribbon tread 705 may be formed at a first location and transported to a second location to be placed on the tire carcass. In an alternative embodiment, the green ribbon tread 705 may be cured or partially cured prior to being placed on a tire carcass. In yet another alternative embodiment, the green ribbon tread may be applied directly to the tire carcass.

Turning now to FIGS. 9-14, rubber strip S and/or the green ribbon tread 705 may be stitched with a bidirectional stitching wheel 900. The bidirectional stitching wheel 900 may be used as the stitching wheel 145 shown in FIGS. 1A and 1B. Of course, other embodiments may include the bidirectional stitching wheel 900 connected to any other appropriate tire building machine in any appropriate way. The tire building machine 100 need not include the bidirectional stitching wheel 900 disposed on a particular side of the strip S to be laid on the drum 130. Similarly, the tire building machine 100 need not have the bidirectional stitching wheel 900 connected to the roller die 125. Instead, the stitching assembly including the bidirectional stitching wheel 900 may be mounted to a frame wholly separate from the roller die 125.

The bidirectional stitching wheel 900 may at least partially conform to the peaks 600, 710 and valleys 610, 715 of a green rubber tread 105, 705 during a tire building operation. The bidirectional stitching wheel 900 may include an inner ring 902. The inner ring 902 may include a stitcher rotation axis A2. The inner ring 902 may be rotatable about the stitcher rotation axis A2 in both a first stitcher rotational direction D1 and a second stitcher rotational direction D2 opposite the first stitcher rotational direction. A flexible outer ring 904 may be radially spaced from the inner ring

902. A flexible intermediate layer 906 may be disposed between the inner ring 902 and the outer ring 904. The flexible intermediate layer 906 may be substantially equally deformable during rotation of the inner ring 902 in both the first stitcher rotational direction D1 and the second stitcher rotational direction D2.

Figure 9:
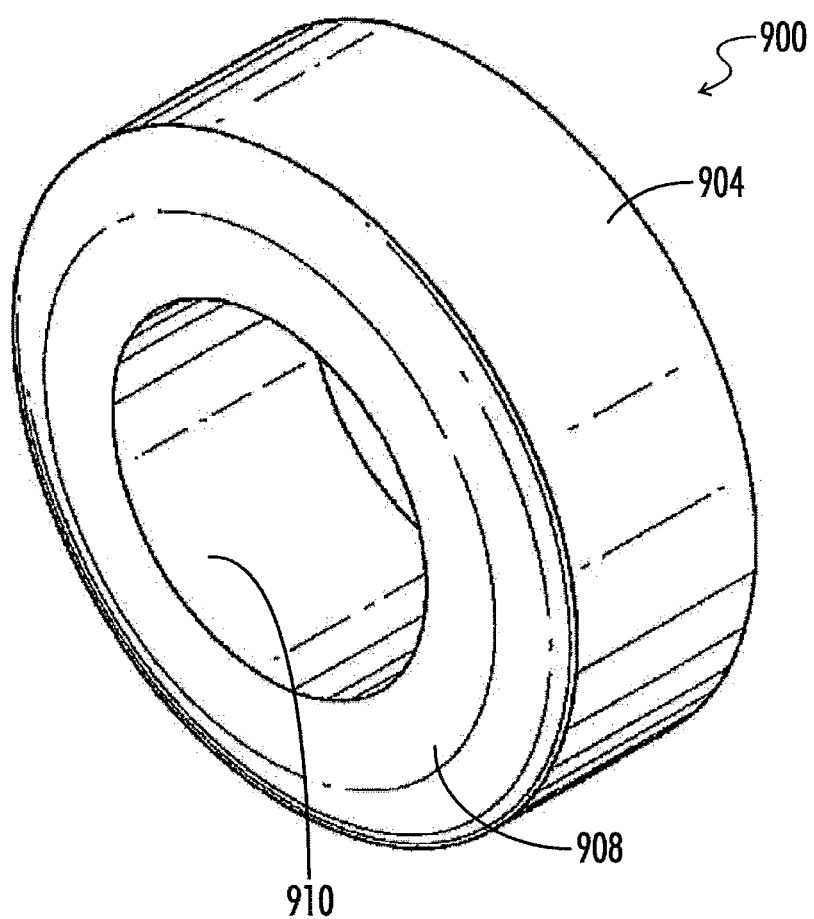
FIG. 9 is perspective view of an embodiment of a bidirectional stitching wheel.
Figure 10:
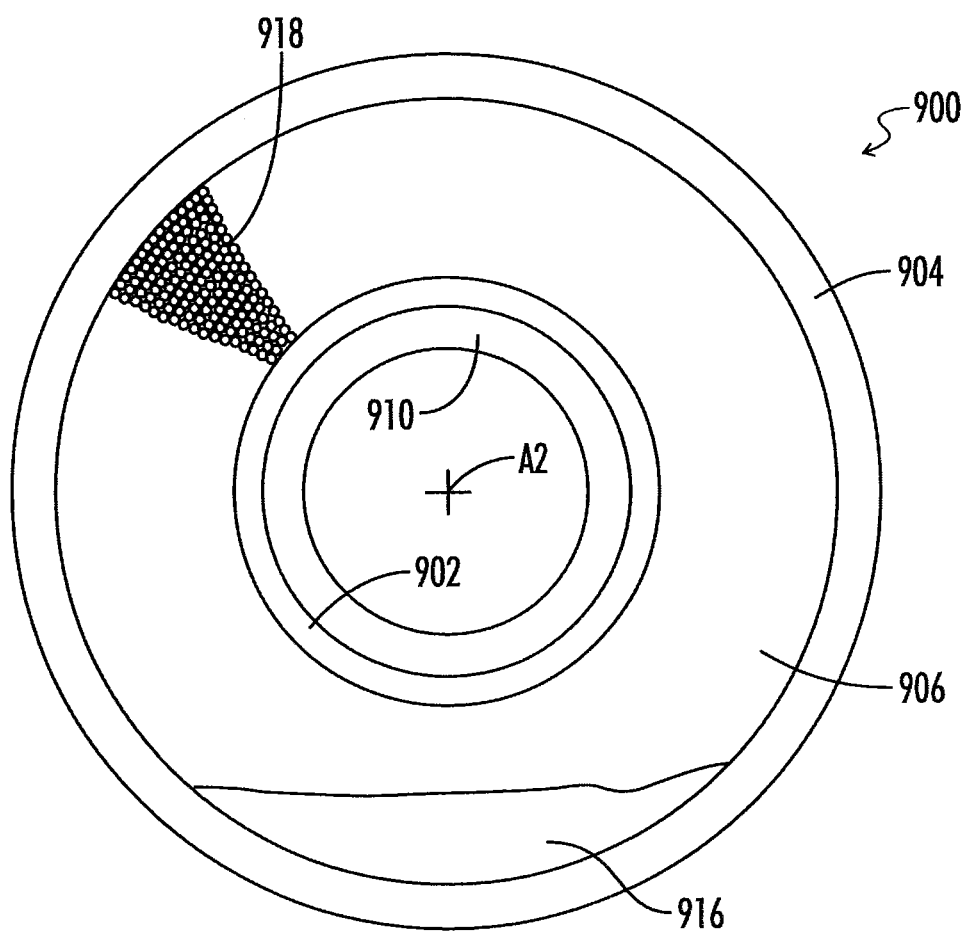
FIG. 10 is a schematic drawing of a cross-sectional side elevation view of the bidirectional stitching wheel of FIG. 9.

The bidirectional stitching wheel 900 may include a sidewall 908 as shown in FIG. 9. Other embodiments of the bidirectional stitching wheel 900 may be without a sidewall. In embodiments including a sidewall 908, the sidewall may be attached to all three of the inner ring 902, the outer ring 904, and the intermediate layer 906. Alternatively, the sidewall 908 may only be partially attached to at least one of the inner ring 902, the outer ring 904, and the intermediate layer 906. The sidewall 908 may at least partially prevent contaminants or other debris from entering the bidirectional stitching wheel 900. This feature may help ensure a consistent flexibility of the stitching wheel 900.

The stitching wheel 900 may include the inner ring 902 including a polymeric material. Some embodiments include the inner ring 902 wholly made of a polymeric material. Non-limiting examples of suitable polymeric materials include plastics, polyurethane, rubber, and the like. In some embodiments, at least one of the outer ring 904 and the intermediate layer 906 may include a polymeric material. In still further embodiments, the inner ring 902, the outer ring 904, and the intermediate layer 906 may all be formed together as a single part out of a polymeric material. In such embodiments, the inner ring 902, the outer ring 904, and the intermediate layer 906 may be made using injection or compression molding, castable polymer, or any other method.

Some embodiments may further include the inner ring 902 including a hub 910. The hub 910 may be configured to connect the stitching wheel 900 to a shaft 912 of the tire building machine 100 (shown in FIG. 1B). The hub 910 may include a polymeric material, but some embodiments additionally or alternatively include a material other than a polymeric material. In some embodiments, the hub 910 may be made of a metal, for instance. The hub 910 may be overmolded with the polymeric material of the inner ring 902, fastened to the inner ring in any appropriate manner, any combination thereof, and the like.

Figure 11:
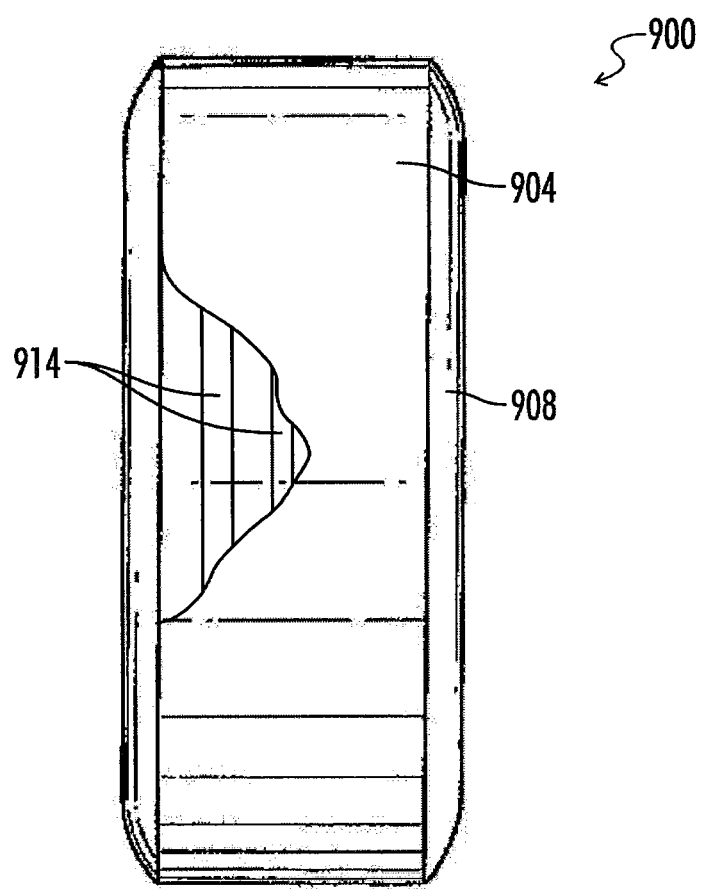
FIG. 11 is a top plan view of the bidirectional stitching wheel of FIG. 9.

As shown in FIG. 11, the outer ring 904, in at least one embodiment, may include at least one internal support layer 914. The at least one internal support layer 914 may include one or more belts made of any appropriate material including, but not limited to, steel or fabric. The internal support layer 914 may additionally or alternatively include any other appropriate material incorporated into or surrounded by the outer ring 904.

The stitching wheel 900 may further include the intermediate layer 906 including a fluid 916 of any type. Appropriate fluids may include water, air, sand, gel, some combination thereof, and the like. Many embodiments of the stitching wheel 900 including a fluid 916 may include sidewalls 908 to contain the fluid. The fluid 916 may completely or only partially make up the intermediate layer 906. The intermediate layer 906 may additionally or alternatively include a foamed polymeric material 918. The foamed polymeric material 918 may completely or only partially make up the intermediate layer 906. Any other appropriate material may also be used for the intermediate layer 906 including, but not limited to, feathers, cotton, textiles, sand, sawdust, dirt, any sort of powder, foam beads, plastic beads, ball bearings, any combination thereof, and the like.

Figure 12:
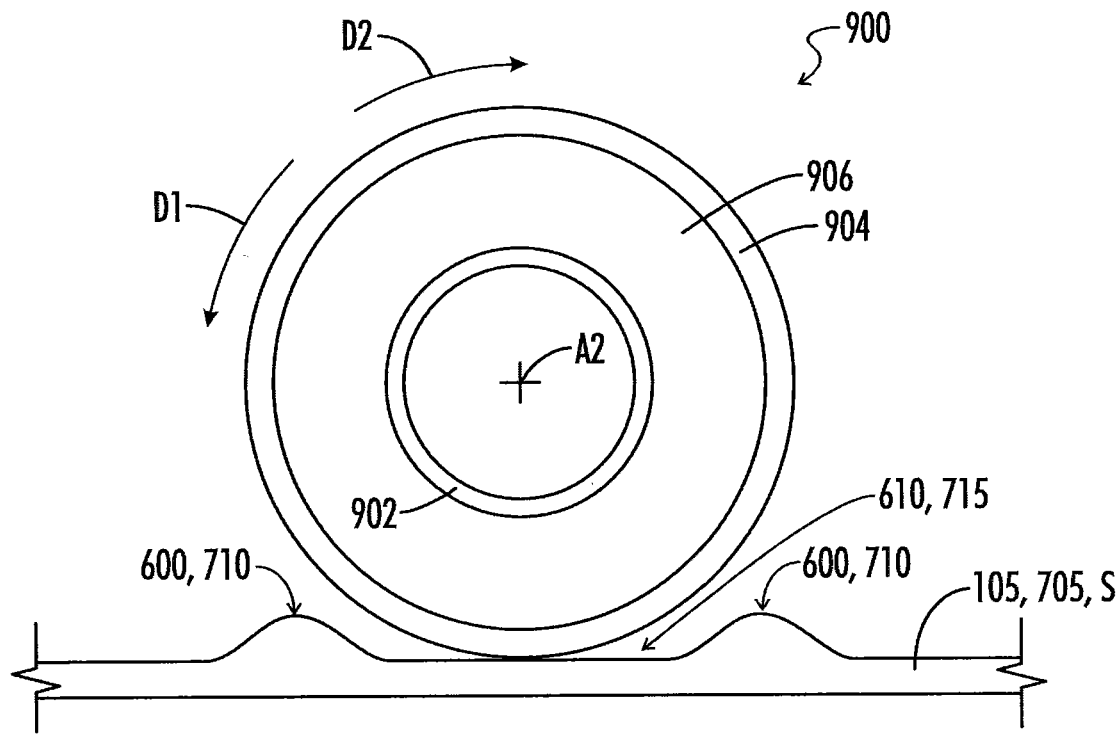
FIG. 12 is a cross-sectional side elevation view of the bidirectional stitching wheel of FIG. 9 traversing the rubber strip of FIG. 6 at a first distance.
Figure 13:
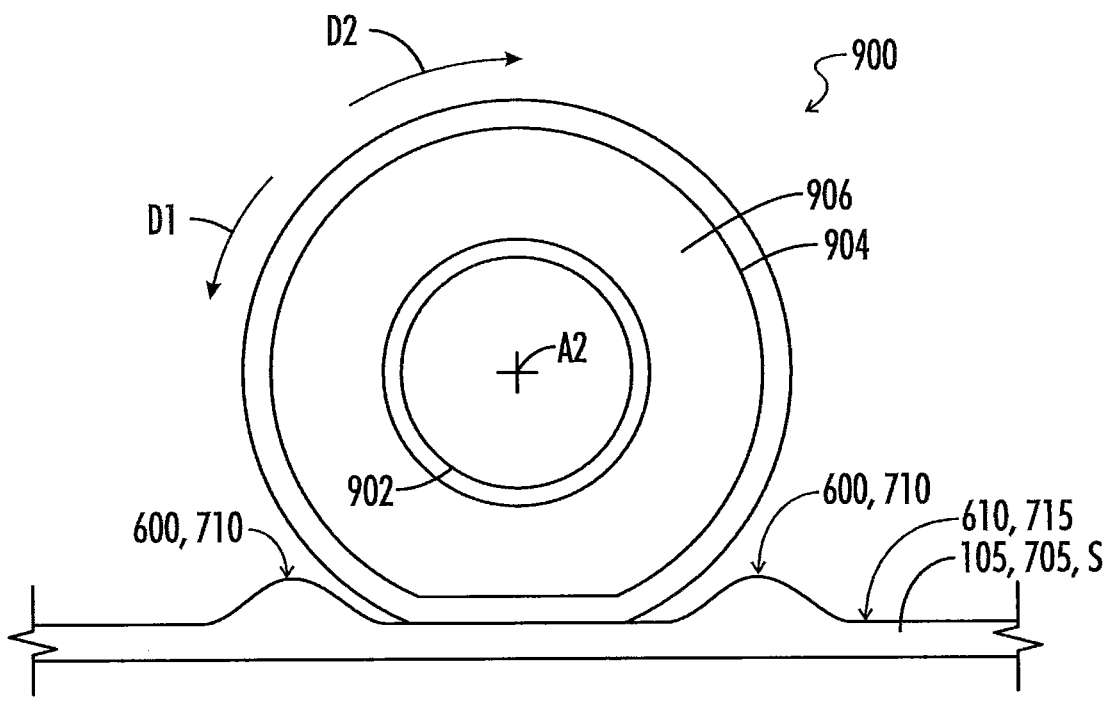
FIG. 13 is a cross-sectional side elevation view of the bidirectional stitching wheel of FIG. 9 traversing the rubber strip of FIG. 6 at a second distance.

Turning now to FIGS. 12 and 13, the stitching wheel 900 can be placed with its stitcher rotation axis A2 at any appropriate distance from the green tread 105, 705. Some embodiments may include a predetermined distance from the green tread 105, 705 based on the resiliency of at least one of the outer ring 904 and the intermediate layer 906.

Figure 14:
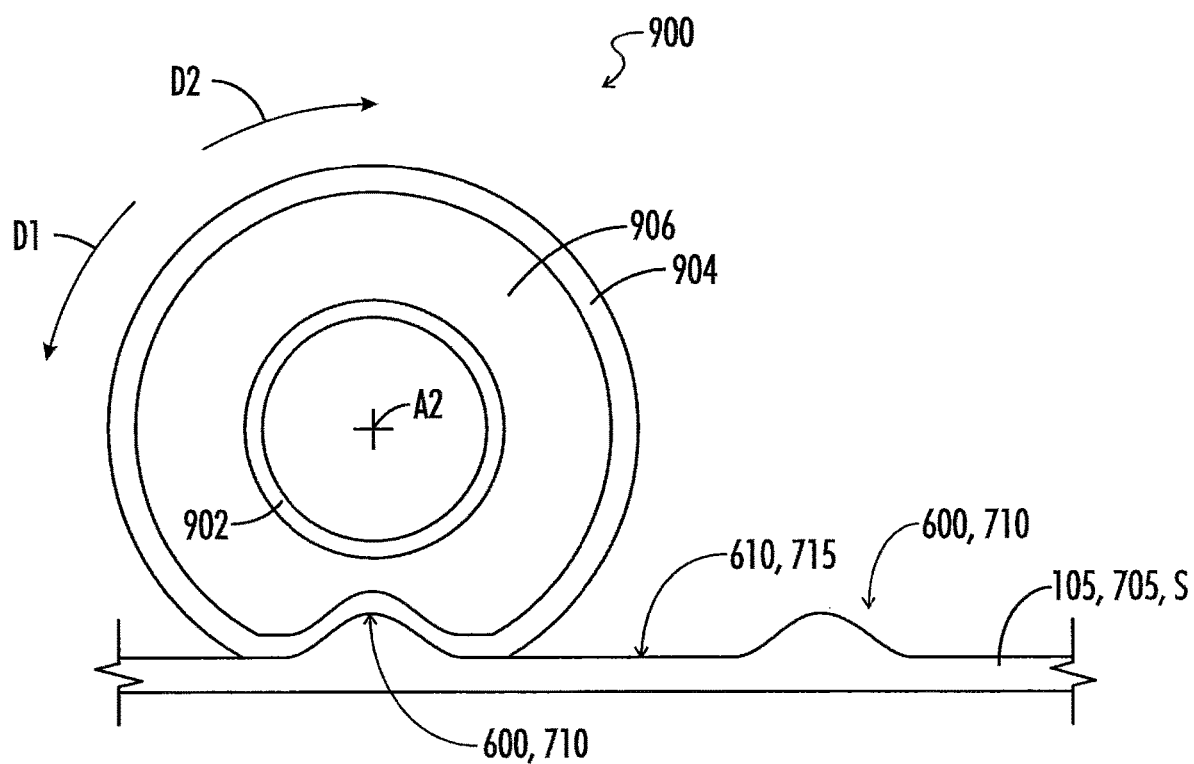
FIG. 14 is a cross-sectional side elevation view of the bidirectional stitching wheel and rubber strip of FIG. 13 with the bidirectional stitching wheel further along the rubber strip.

As shown in FIGS. 13 and 14, the stitching wheel 900 may be configured to deform as needed due to pressures exerted on it by the green tread 105, 705. As shown in FIG. 14, the stitching wheel 900 may conform about respective peaks 710 of the green ribbon tread 705. In this manner, the peaks 710 may be only minimally flattened, if at all, by the pressure of the stitching wheel 900 when compared to conventional stitching wheels. The stitching wheel 900 may also be substantially or completely radially symmetrical. Because the stitching wheel 900 may be substantially, or completely, equally deformable when rotated in either stitcher rotational direction D1, D2, the stitching wheel 900 may approach each peak 710 from first one side and then another side to help ensure proper layer stitching. Stated another way, the stitching wheel 900 may be configured to be deformable to a substantially similar degree, or to the same degree, during rotation in both stitcher rotational directions D1, D2. Some embodiments may include the deformability of the stitching wheel 900 in the first stitcher rotational direction D1 being between about 90% and about 110% of the deformability of the stitching wheel in the second stitcher rotational direction D2.

As shown in FIGS. 15-25, still other embodiments of the stitching wheel 900 may include the intermediate layer 906 including an interconnected web 920. The interconnected web may include a plurality of cells 922. The cells 922 can be any appropriate shape including, but not limited to, any polygon (for instance, triangles, rectangles, pentagons, hexagons, heptagons, octagons, dodecagons, and the like), ovals, circles, ellipsoids, and the like.

Figure 15:
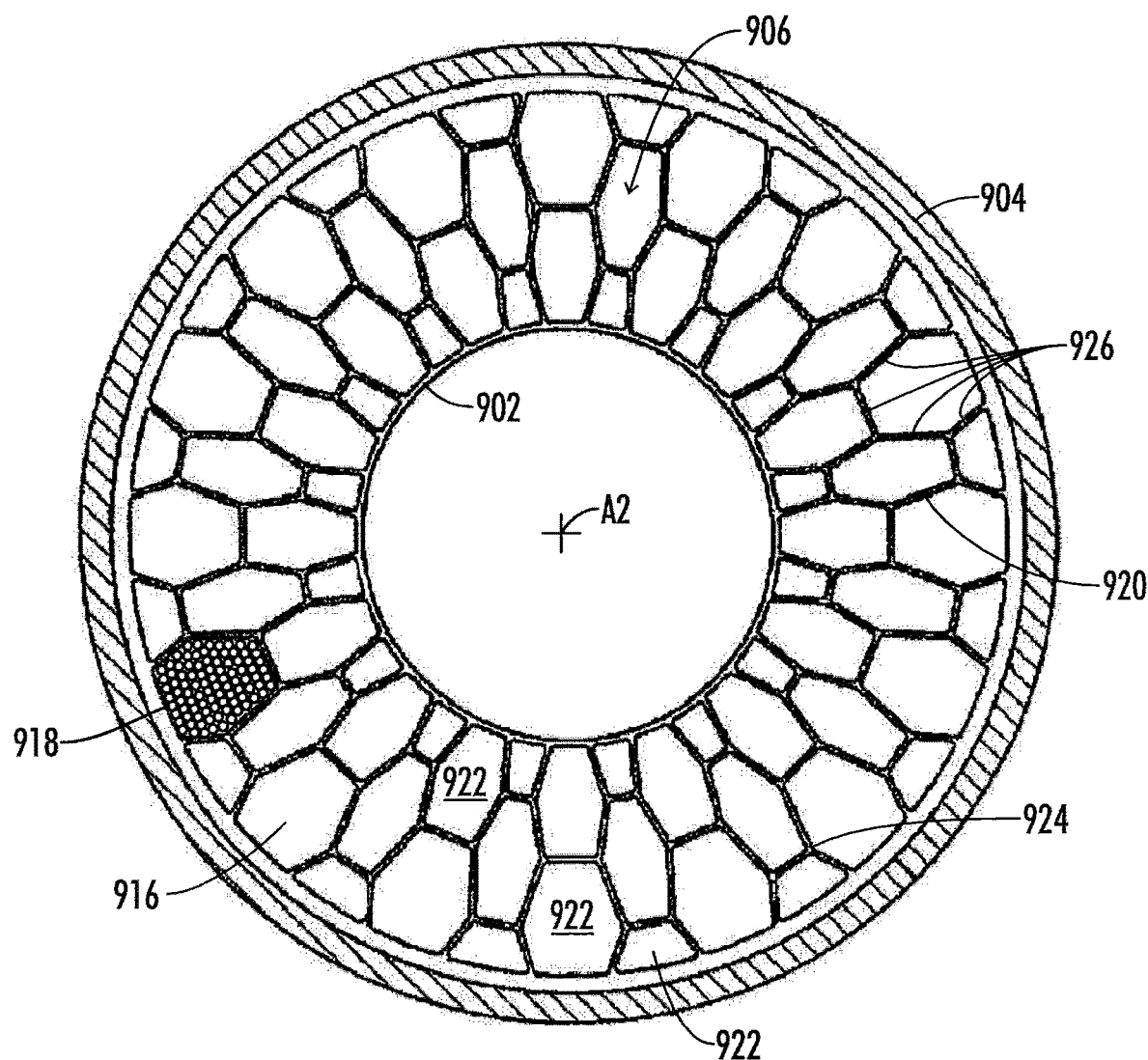
FIG. 15 is a side elevation view of another embodiment of a bidirectional stitching wheel.
Figure 16:
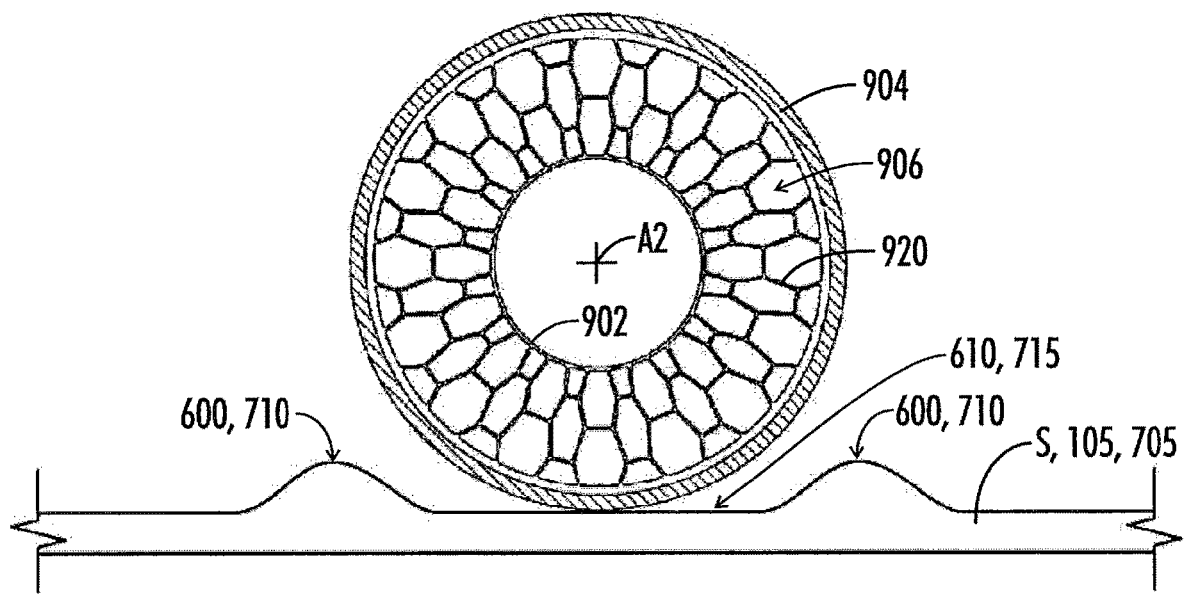
FIG. 16 is a side elevation view of the bidirectional stitching wheel of FIG. 15 traversing the rubber strip of FIG. 6 at a first distance.
Figure 17:
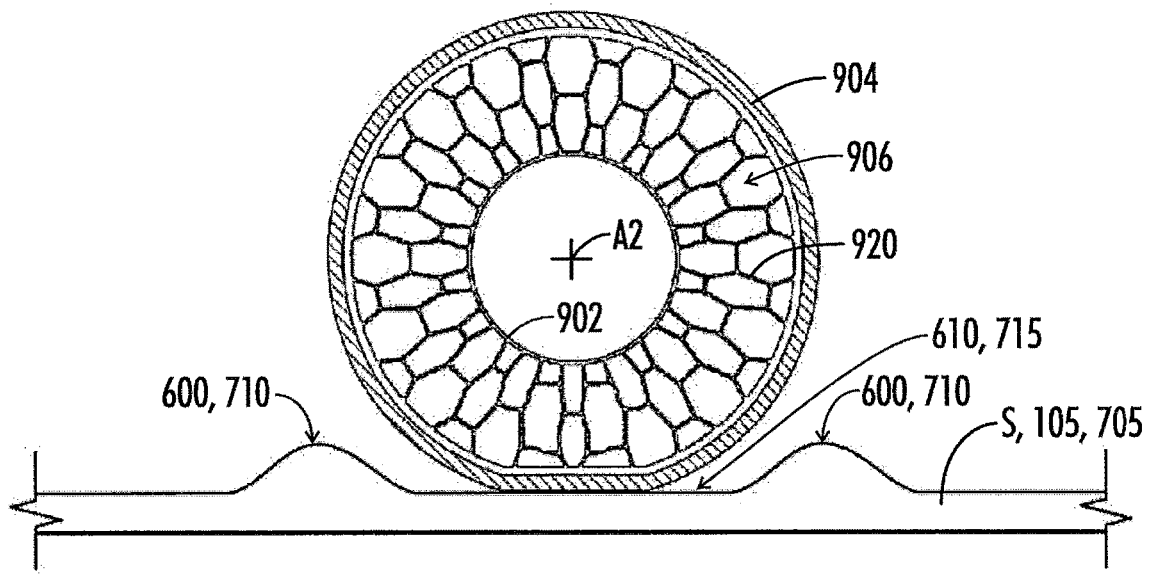
FIG. 17 is a side elevation view of the bidirectional stitching wheel of FIG. 15 traversing the rubber strip of FIG. 6 at a second distance.
Figure 18:
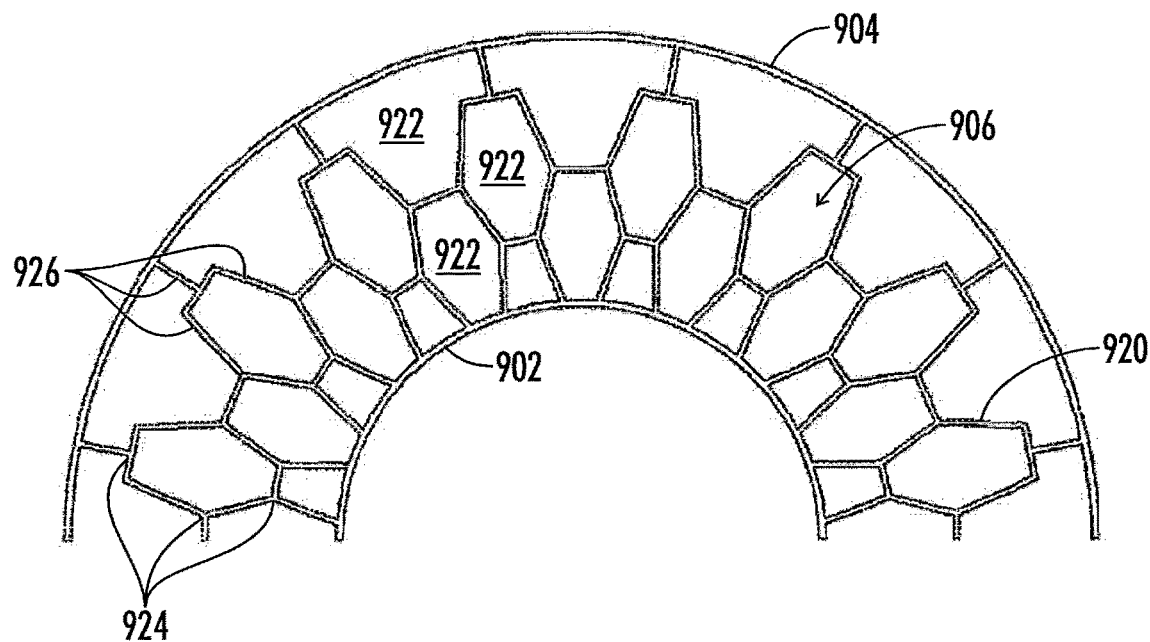
FIGS. 18-24 are detailed side elevation views of various example web patterns for the bidirectional stitching wheel of FIG. 15.
Figure 19:
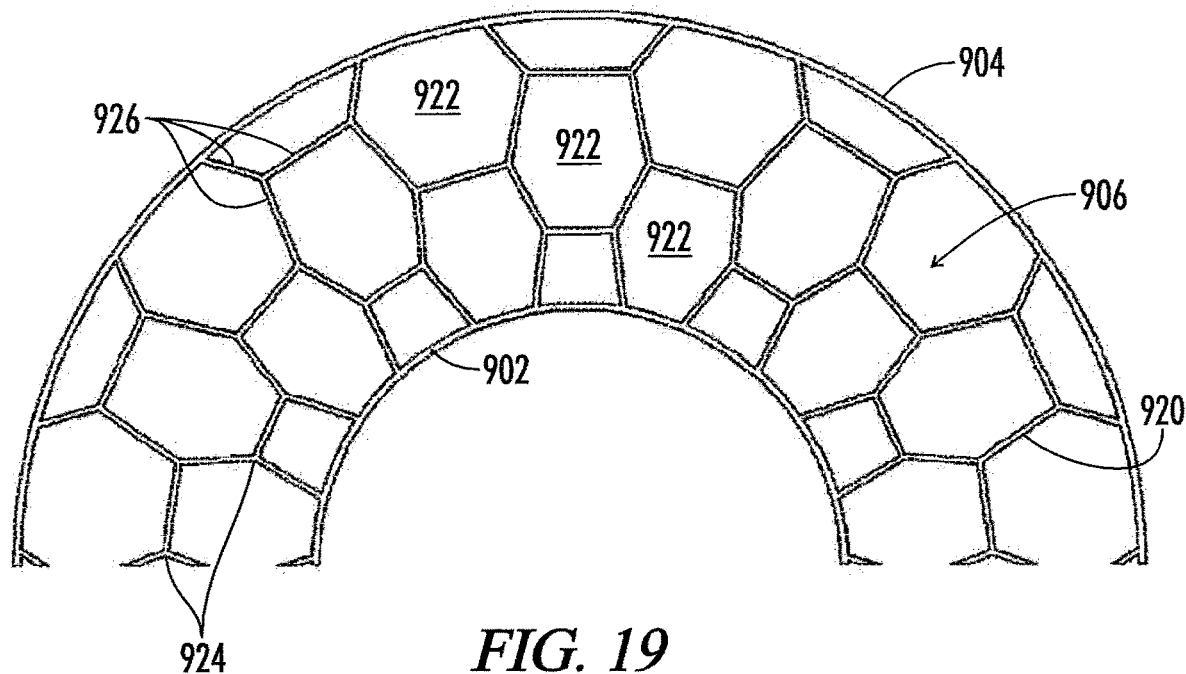
Figure 20:
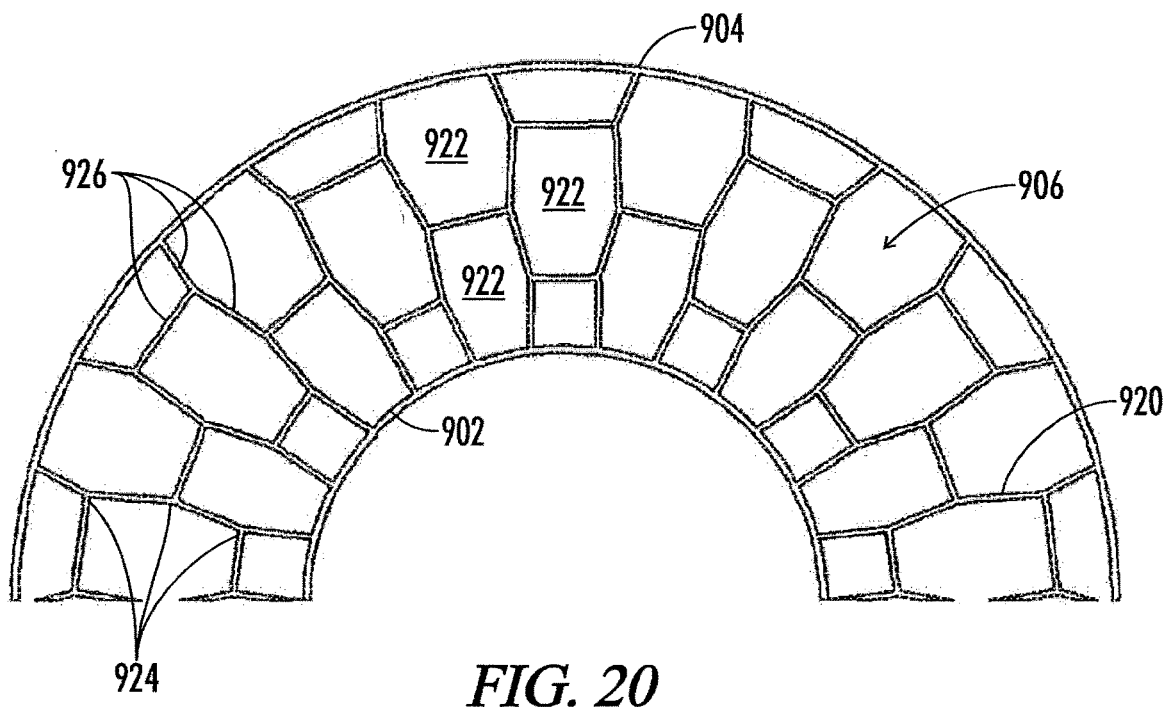
Figure 21:
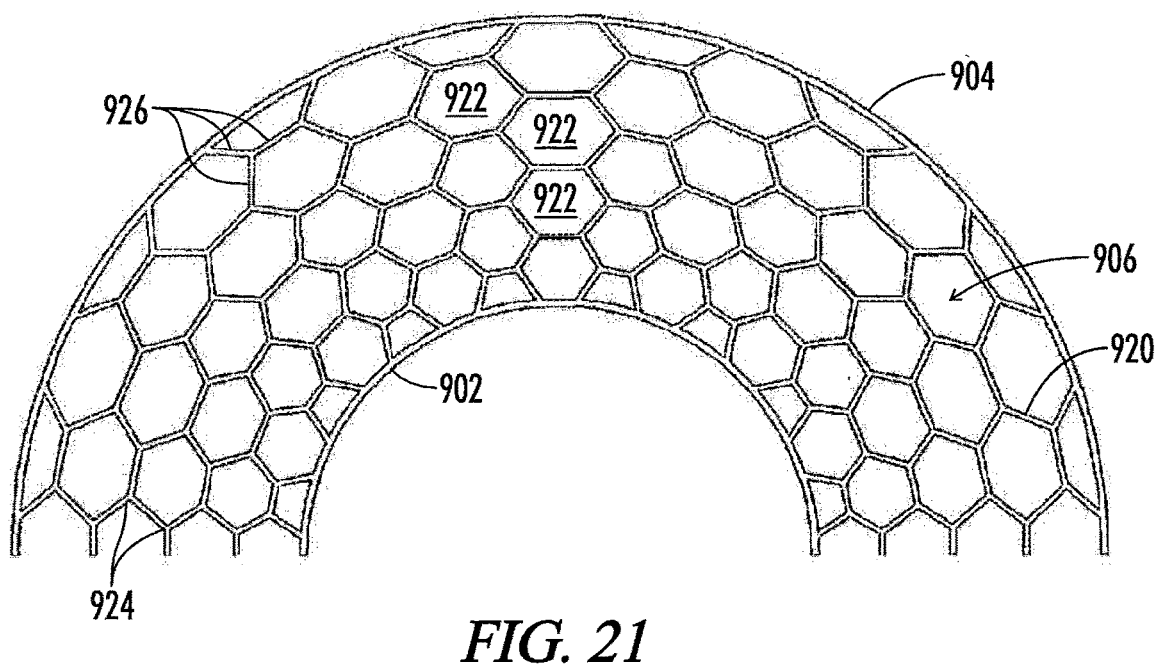
Figure 22:
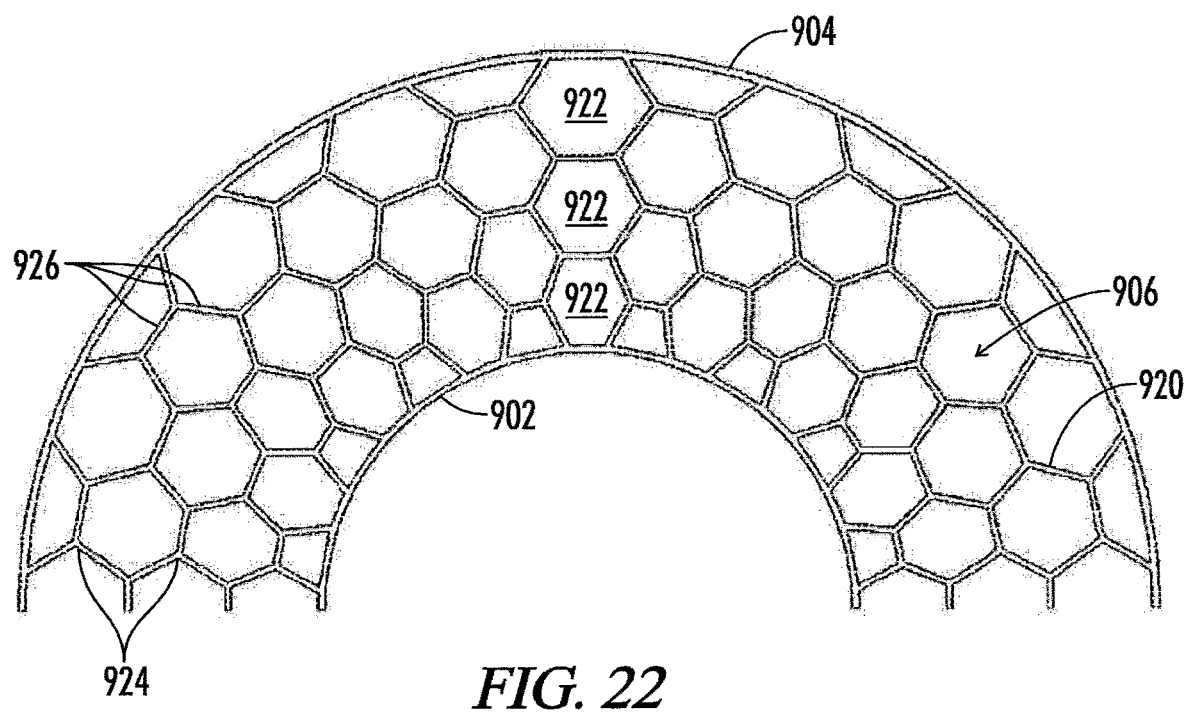
Figure 23:
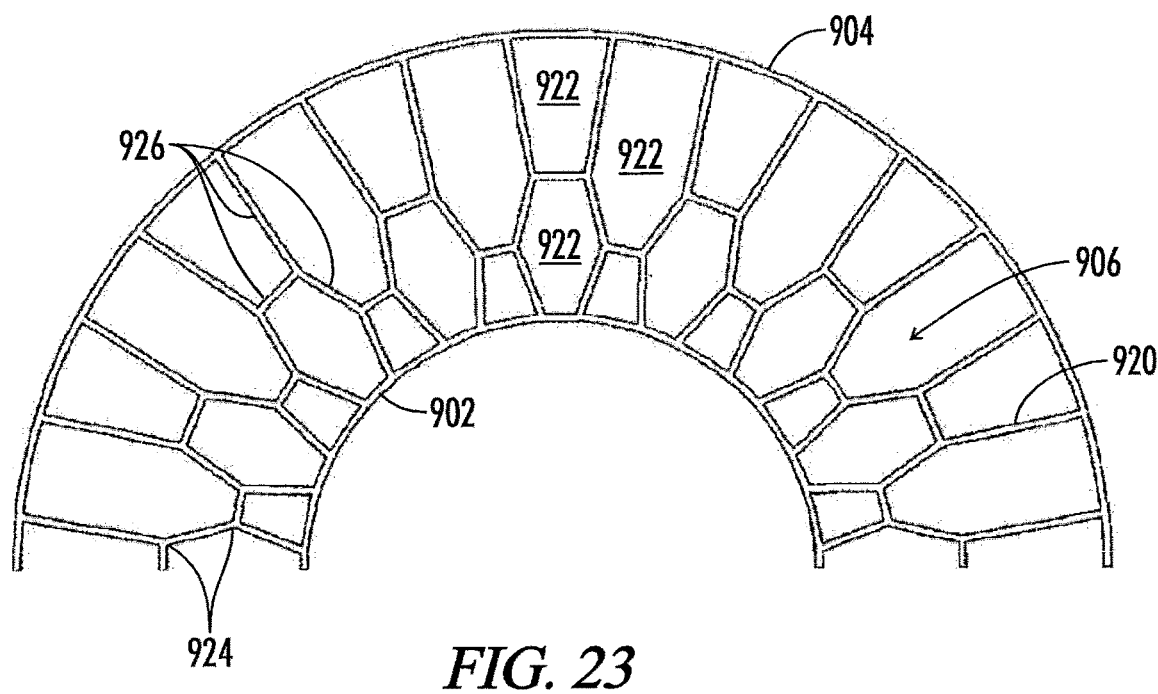
Figure 24:
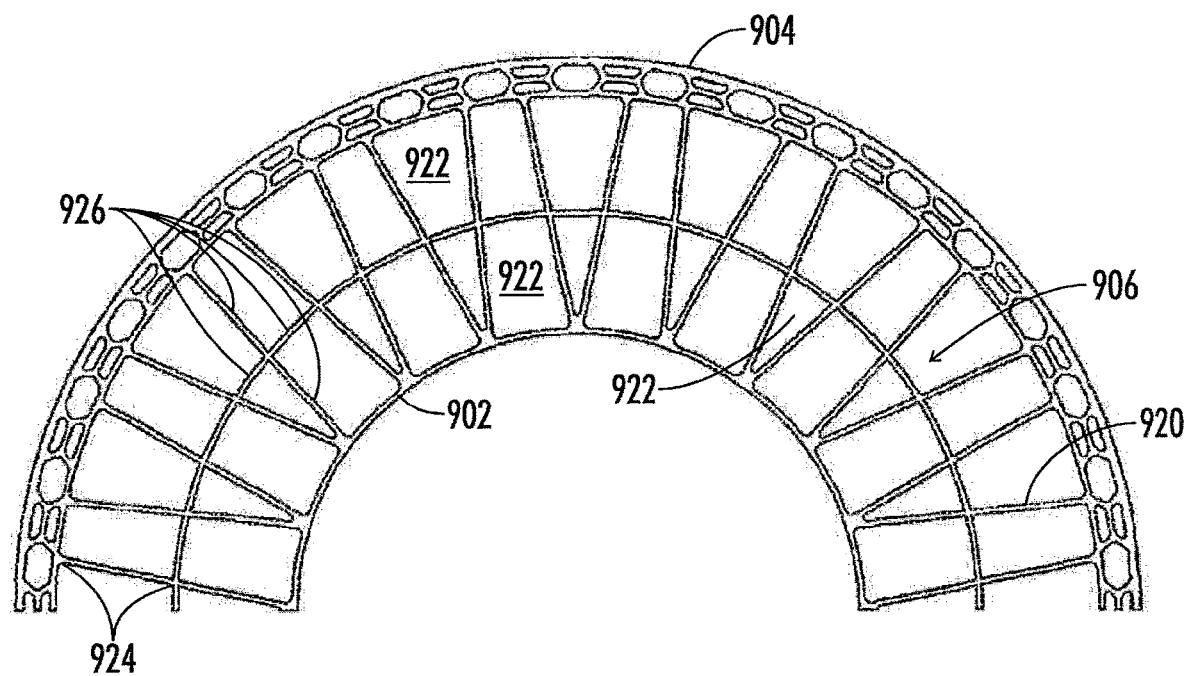

As shown in FIG. 15, further embodiments of the stitching wheel 900 may include a foam, such as a foamed polymeric, material 918, disposed between the interconnected web 920 (or in at least some of the cells 922). Still other embodiments may include a fluid 916 disposed between the interconnected web 920 (or in at least some of the cells 922).

The interconnected web 920 may be connected to the outer ring 904 and the inner ring 902. The interconnected web 920 may also include one or more radially adjacent layers of cells 922. In many embodiments, a majority of the cells 922 include hexagonal cells, giving the intermediate layer 906 a honeycomb appearance. The interconnected web 920 may also include intersections 924 to distribute any outside applied force throughout the interconnected web. In some embodiments, each intersection 924 may connect at least three web elements 926 of the interconnected web 920. The combination of the geometry of the cells 922, the thickness of the elements 926 of the interconnected web 920, the material chosen for the interconnected web, and the like may allow an outside applied force to be distributed throughout the interconnected web. The web elements 926 may include any appropriate materials including, but not limited to, any polymer, carbon fibers, KEVLAR, any combination thereof, and the like. The web elements 926 may have relatively low strength in compression and relatively high strength in tension, light weight, good fatigue life, and the like.

When the stitching wheel 900 encounters an outside force from, for instance, a peak 710 of the green ribbon tread 705, the interconnected web 920 may be configured to locally buckle due to the compressive force between the peak and the shaft 912 of the tire building machine 100. While the buckle occurs proximate the peak 710, the rest of the interconnected web 920 may experience a tensile force.

Figure 25:
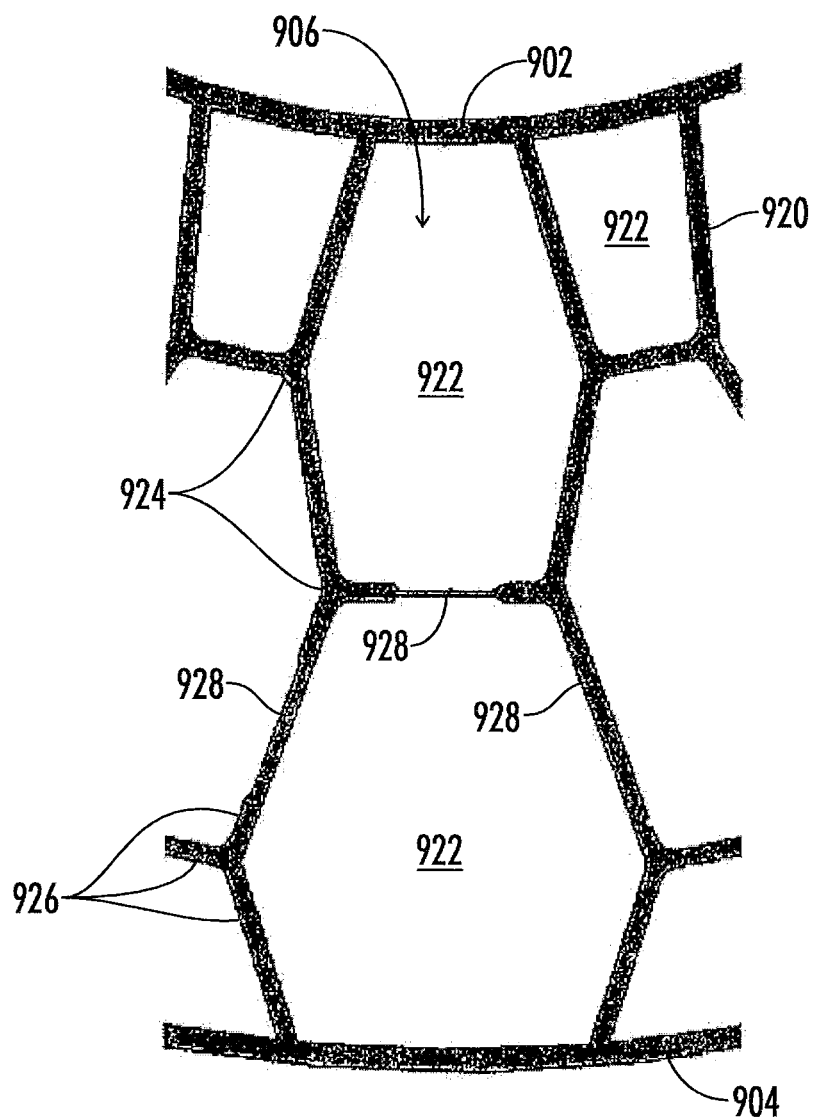
FIG. 25 is a detailed side elevation view of a web pattern for the bidirectional stitching wheel of FIG. 15 having weakened points to control buckling.

As shown in FIG. 25, some or all of the web elements 926 may include weakened or thinned sections 928 such that the web elements are more likely to bend in a given predetermined direction. As such, web elements 926 rubbing against each other (potentially causing damage over time) can be avoided, for instance. Other embodiments of the stitching wheel 900 having the interconnected web 920 may additionally or alternatively include at least one web element 926 that is curved to encourage controlled buckling.

As stated above, sidewalls 908 may be included to protect the interconnected web 920 from outside contaminants or damage, to contain the fluid 916 or foamed polymeric material 918, and the like. The sidewalls 908 may further function as a structural element in conjunction with the interconnected web 920 in some embodiments. Other embodiments of the stitching wheel 900 having the interconnected web 920 may omit sidewalls 908. The lack of sidewalls 908 may allow for ventilation of the web elements 926 to prevent damage due to heat, allow a user to easily inspect the web elements for damage, and the like.

The present disclosure is also directed to a method of stitching together layers of a green tire 705. The method may include: rotating the drum 130 of the tire building machine 100 about the drum rotation axis A1 in a first drum rotational direction D3 with green rubber 705 on the drum; engaging an outer layer of the green rubber with the bidirectional stitcher 900 while the drum rotates in the first drum rotational direction; rotating the bidirectional stitcher about the stitcher rotation axis A2 in the first stitcher rotational direction D1 (opposite the first drum rotational direction); deforming the stitcher around a respective peak 710 of the green rubber while the drum and the stitcher both rotate; and repeating the above steps with the drum rotating in the second drum rotational direction D4 and the stitcher rotating in the second stitcher rotational direction D2 (opposite the second drum rotational direction). The method may further include deforming the stitcher 900 at least partially even when the stitcher is engaging a valley 715 of the green ribbon tread 705. The method may also further include rotating the stitcher 900 passively when the stitcher engages the green ribbon tread 705 on the rotating drum 130.

Once the tire building on the drum 130 has been completed, the green tire is then placed in a vulcanization mold. The vulcanization mold includes a tread forming portion that imparts tread elements onto the tire. For example, the vulcanization mold may include a tread forming portion for an agricultural tire or off road tire that includes voids for forming lugs (or bars) on the tread, and protrusions for forming valleys between the lugs. The green tire is oriented in the vulcanization mold such that the peaks 710 of the green ribbon tread 705 are aligned with voids in the tread forming portion of the mold. During curing of the green tire, rubber flows into voids of the vulcanization mold. However, because of the alignment of the peaks 710 of the green ribbon tread 705, less rubber needs to flow into the voids compared to a smooth green tread.

As one of ordinary skill in the art will appreciate, the methods and constructions described in this disclosure will increase yield. For instance, reducing the volume between the green tire and the mold features may help improve yield because it reduces rubber flow and resulting gauge variation (such as belt wave) in various reinforcing structures. The methods and constructions described in this disclosure may reduce gauge variation and/or belt wave, particularly in large tires and agricultural tires, where portions of the belt have been known to migrate toward a lug during vulcanization.

Likewise, the methods and constructions described in this disclosure may improve cord distortion and improve tire appearance. The methods and constructions described in this disclosure may also allow for rubber savings. For example, the methods and constructions described herein may require between approximately 10-20% less material and result in a tire having 20% less weight.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A tire building machine comprising:
a drum for receiving layers of green rubber to build a tire, the drum including a drum rotation axis, the drum configured to rotate about the drum rotation axis in a first drum rotational direction and a second drum rotational direction opposite the first drum rotational direction;
a bidirectional stitching wheel including a stitcher rotation axis and an interconnected web surrounding the stitcher rotation axis, the interconnected web including a plurality of polygonal cells, the stitching wheel configured to rotate about the stitcher rotation axis in a first stitcher rotational direction and a second stitcher rotational direction opposite the first stitcher rotational direction, the interconnected web configured to enable a deformability in shape of the stitching wheel during rotation in the first stitcher rotational direction and the second stitcher rotational direction such that a depth of deformation in the first stitcher rotational direction is between about 90% and about 110% of a depth of deformation of the stitching wheel during rotation in the second stitcher rotational direction; and
wherein:
the stitching wheel rotates in the first stitcher rotational direction when the drum rotates in the first drum rotational direction; and
the stitching wheel rotates in the second stitcher rotational direction when the drum rotates in the second drum rotational direction.

2. The tire building machine of claim 1, wherein the bidirectional stitching wheel is configured to be equally deformable in shape during rotation in both the first stitcher rotational direction and the second stitcher rotational direction.

3. The tire building machine of claim 1, wherein the stitching wheel is configured to passively rotate due to rotation of the drum.

4. The tire building machine of claim 1, further comprising a plurality of bidirectional stitching wheels.

5. The tire building machine of claim 1, wherein the stitching wheel further comprises:
   an inner ring rotatable in the first stitcher rotational direction about the stitcher rotation axis and the second stitcher rotational direction about the stitcher rotation axis;
   a flexible outer ring radially spaced from the inner ring; and
   a flexible intermediate layer disposed between the inner ring and the outer ring, the flexible intermediate layer comprised of at least the interconnected web.

6. The tire building machine of claim 5, wherein the inner ring includes a polymeric material.

7. The tire building machine of claim 6, wherein the inner ring further includes a hub to connect the stitching wheel to a shaft.

8. The tire building machine of claim 7, wherein:
   the hub includes a material other than a polymer; and
   the hub is overmolded with the polymeric material of the inner ring.

9. The tire building machine of claim 7, wherein:
   the hub includes a material other than a polymer; and
   the inner ring is fastened to the hub.

10. The tire building machine of claim 6, wherein the outer ring and the flexible intermediate layer also include a polymeric material.

11. The tire building machine of claim 10, wherein the inner ring, the outer ring, and the flexible intermediate layer are integrally formed together.

12. The tire building machine of claim 1, wherein the flexible intermediate layer further includes a foam disposed between the interconnected web.

13. The tire building machine of claim 1, wherein the flexible intermediate layer further includes a fluid disposed between the interconnected web.

14. The tire building machine of claim 1, wherein the bidirectional stitching wheel is substantially radially symmetrical such that there is a mirror symmetry of the interconnected web on either side of a plane defined by a radial line perpendicular from the stitcher rotation axis and extending along the stitcher rotation axis.

15. The tire building machine of claim 5, wherein the outer ring includes at least one internal support layer.

16. The tire building machine of claim 15, wherein the at least one internal support layer includes a steel belt.

17. A tire building machine comprising:
   a drum for receiving layers of green rubber to build a tire, the drum including a drum rotation axis, the drum configured to rotate about the drum rotation axis in a first drum rotational direction and a second drum rotational direction opposite the first drum rotational direction;
   a bidirectional stitching wheel including a stitcher rotation axis and an interconnected web surrounding the stitcher rotation axis, the interconnected web including a plurality of polygonal cells, the interconnected web being substantially radially symmetrical such that there is a mirror symmetry of the interconnected web on either side of a plane defined by a radial line perpendicular from the stitcher rotation axis and extending along the stitcher rotation axis, the stitching wheel configured to rotate about the stitcher rotation axis in a first stitcher rotational direction and a second stitcher rotational direction opposite the first stitcher rotational direction; and
   wherein:
      the stitching wheel rotates in the first stitcher rotational direction when the drum rotates in the first drum rotational direction; and
      the stitching wheel rotates in the second stitcher rotational direction when the drum rotates in the second drum rotational direction.

18. The tire building machine of claim 17, wherein the stitching wheel further comprises:
   an inner ring rotatable in the first stitcher rotational direction about the stitcher rotation axis and the second stitcher rotational direction about the stitcher rotation axis;
   a flexible outer ring radially spaced from the inner ring; and
   a flexible intermediate layer disposed between the inner ring and the outer ring, the flexible intermediate layer comprised of at least the interconnected web.

19. The tire building machine of claim 18, wherein the inner ring includes a polymeric material.

20. The tire building machine of claim 19, wherein the inner ring further includes a hub to connect the stitching wheel to a shaft.

21. The tire building machine of claim 20, wherein:
   the hub includes a material other than a polymer; and
   the hub is overmolded with the polymeric material of the inner ring.

22. The tire building machine of claim 20, wherein:
   the hub includes a material other than a polymer; and
   the inner ring is fastened to the hub.

23. The tire building machine of claim 19, wherein the outer ring and the flexible intermediate layer also include a polymeric material.

24. The tire building machine of claim 23, wherein the inner ring, the outer ring, and the flexible intermediate layer are integrally formed together.

\* \* \* \* \*